US009311306B2

(12) United States Patent
Tamura

(10) Patent No.: US 9,311,306 B2
(45) Date of Patent: Apr. 12, 2016

(54) INFORMATION PROCESSING APPARATUS, INFORMATION PROCESSING METHOD AND STORAGE MEDIUM IN WHICH PROGRAM THEREOF IS RECORDED

(75) Inventor: Makiya Tamura, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 372 days.

(21) Appl. No.: 12/233,074

(22) Filed: Sep. 18, 2008

(65) Prior Publication Data
US 2009/0083286 A1    Mar. 26, 2009

(30) Foreign Application Priority Data

Sep. 20, 2007 (JP) .................... 2007-244100

(51) Int. Cl.
*G06F 17/30* (2006.01)

(52) U.S. Cl.
CPC .... *G06F 17/30011* (2013.01); *G06F 17/30873* (2013.01)

(58) Field of Classification Search
CPC ................................. G06F 17/30873
USPC .................................. 707/610, 690
See application file for complete search history.

(56) References Cited

U.S. PATENT DOCUMENTS

| 5,590,266 | A  | * | 12/1996 | Carson et al. ................ 715/741 |
| 5,926,633 | A  |   | 7/1999  | Takagi |
| 6,338,084 | B1 | * | 1/2002  | Rankin et al. ................ 709/214 |
| 6,704,770 | B1 | * | 3/2004  | Ramakesavan ............... 709/205 |
| 7,509,577 | B2 | * | 3/2009  | Kuwata et al. ................ 715/256 |
| 7,870,493 | B2 | * | 1/2011  | Pall et al. ..................... 715/751 |
| 2004/0039995 | A1 | * | 2/2004 | Kuwata et al. ................ 715/530 |

(Continued)

FOREIGN PATENT DOCUMENTS

| JP | 07-013835 | 1/1995 |
| JP | 7-244720 | 9/1995 |
| JP | 2002-123785 | 4/2002 |

(Continued)

OTHER PUBLICATIONS

Chinese Office Action dated Jun. 9, 2011 issued during prosecution of related Chinese application No. 200810161336.0 (whole English-language translation included).

(Continued)

*Primary Examiner* — Kris Mackes
(74) *Attorney, Agent, or Firm* — Fitzpatrick, Cella, Harper & Scinto

(57) ABSTRACT

An information processing apparatus uses unique IDs to manage items, such as electronic files and folders, to be operated and includes: an information share window ID managing section managing, in a share window ID management DB, information of the window Ids corresponding to windows of Web browsers that are to share information; an item storing processing section storing item information in an item information DB when a first operation for the item is instructed from a first Web browser; a stored item processing section executing a second operation based on the item information stored in the item information DB and the information of the window Ids stored in the share window ID management DB when the second operation is instructed from a second Web browser; This apparatus enables collaborative operations between two windows of Web browsers.

42 Claims, 25 Drawing Sheets

(56) References Cited

U.S. PATENT DOCUMENTS

2007/0186157 A1* 8/2007 Walker et al. ............. 715/530
2008/0195969 A1* 8/2008 Brown et al. ............. 715/802

FOREIGN PATENT DOCUMENTS

| JP | 2002-176675 | 6/2002 |
| JP | 2002-288162 | 10/2002 |
| JP | 2006-314073 | 11/2006 |
| JP | 2007-233630 | 9/2007 |
| WO | 2007/041618 | 12/2007 |

OTHER PUBLICATIONS

Japanese Office Action dated Sep. 18, 2012 issued during prosecution of related Japanese application No. 2007-244100.

Japanese Office Action dated Dec. 11, 2012 issued during prosecution of related Japanese Application No. 2007-244100.

Freesoft Labo, Linux Magazine, ASCII Media Works, Inc., vol. 6, No. 11, pp. 108-109. (English-language partial translation included), Nov. 2004.

Japanese Office Action dated Mar. 12, 2013 issued during prosecution of related Japanese application No. 2007-244100.

Japanese Office Action dated Sep. 16, 2014 issued during prosecution of related Japanese application No. 2013-172529.

Japanese Office Action issued Mar. 24, 2015 during prosecution of related Japanese application No. 2013-172529, which is a divisional of Japanese application No. 2007-244100 from which the present application claims priority. (Whole English-language machine generated translation included.).

Yuki Noda, Windows Vista Perfect Master [Home Basic Home Premium Business Correspondence], 1st Edition, Microsoft Windows Vista, Inc., Syuwa System Saito Kazukuni, Apr. 1, 2007, the 1st Edition, pp. 212-220. (Partial English-language translation included.).

* cited by examiner

| FIG.4A |
|---|
| FIG.4B |

| ITEM ID | ITEM NAME | OPERATING USER | WINDOW ID | SIMULTANEOUS SELECTION ID | LOCK FLAG |
|---|---|---|---|---|---|
| XXX001 | CREATED DOCUMENT | USER A | ID_A | S0001 | LOCK |
| XXX002 | ITEM DEFINITION | USER B | ID_D | S0001 | LOCK |
| XXX003 | SPECIFICATION | USER B | ID_D | S0002 | UNLOCK |
| XXX004 | SURVEY DOCUMENT | USER B | ID_D | S0002 | UNLOCK |
| ... | ... | ... | ... | ... | ... |

FIG.8

INFORMATION PROCESSING APPARATUS, INFORMATION PROCESSING METHOD AND STORAGE MEDIUM IN WHICH PROGRAM THEREOF IS RECORDED

BACKGROUND OF THE INVENTION

1. Field of the Invention

The present invention relates to an information processing apparatus and an information processing method for providing a document-management service on a network such as the Internet, as well as a storage medium thereof. More specifically, the present invention relates to a technique for improving the operability of operations such as copying and moving a document in a document management service provided on a Web browser which is used by end users.

2. Description of the Related Art

Nowadays, with the advancement of network technologies and wide spread of networks, it has become a common usage that multiple users share electronic files on a network to carry out certain work on the files. Electronic files can be shared by use of a basic function of an operating system such as UNIX (registered trademark) and Windows (registered trademark). In the case of Windows, for example, using application software such as Windows Explorer, users can easily share and manage electronic files that are managed in a file system.

Besides the aforementioned share and management using the basic function of the operating system, there are dedicated document management systems (document management servers) that enable the share and management of electronic files. Examples of such document management systems include a document management system with enhanced security for use in a particular company or specific business, and a document management system with improved users' usability.

The following shows possible basic operations that users may perform by using such a document management system for sharing and managing electronic files or a Windows file system:

Operation 1) create a folder in the system;
Operation 2) register a document (electronic file) in a certain folder in the system;
Operation 3) change a storage location by performing a move operation for a certain folder or document managed in the system;
Operation 4) update a certain document managed in the system by editing the document; and
Operation 5) perform a delete operation on a certain registered folder or document managed in the system to delete the folder or document from the document management system.

Here, as an example, consider an operation of copying or moving a document in a Windows file system by using Windows Explorers. As for a Windows operating system, application software operating on the operating system is assigned a sharable memory area named a clipboard. By performing an operation on Windows Explorer, a user can more easily copy or move a document by use of the clipboard.

For instance, suppose a case where documents are arranged in the following folder structure on the file system.

Specifically, 100 folders such as "folder00," "folder01," . . . , "folder99" exist directly under a root folder. 8 folders such as "folder0.00," "folder0.01," . . . , "folder0.07" exist directly under the folder "folder30." In addition, 10 folders such as "folder00.00," "folder00.01," . . . , "folder00.09" exist directly under the folder "folder 0.01."

Incidentally, "file00.txt," "file01.txt," . . . , "file09.txt" exist under the folder "folder00.01."

In this situation, here, suppose that "file00.txt," "file01.txt," . . . , "file09.txt" are copied at once in another folder "folder01." For this purpose, a user usually launches two Windows Explorers on a personal computer (PC) at the same time and performs the following operations.

Specifically, the user selects "file00.txt," "file01.txt," . . . , "file09.txt" displayed in a list on one of the two Windows Explorer screens displayed as in FIG. 1, and presses down the "Ctrl" key and the "C" key at the same time. By this operation, the selected files are copied on the clipboard.

Thereafter, the user selects "folder01" displayed on the other Windows Explorer screen displayed as in FIG. 2, and presses down the "Ctrl" key and the "V" key at the same time. By this operation, the previously-selected files "file00.txt," "file01.txt," . . . , "file09.txt" are pasted under the folder "folder01."

Under the Windows OS environment such as a PC, in general, two or more applications share the memory area named the clipboard as described above, and the shared clipboard allows a folder or file to be copied and pasted from one application to another application. For copy and paste, the user can perform the operation while causing multiple application windows (for example, two Windows Explorer screens as shown in FIGS. 3A and 3B) to display the contents of a copy source folder and a copy destination folder, respectively. Thus, the use of Windows Explorers achieves the operability that provides more easily understandable display to users while reducing workload on the users.

Moreover, Japanese Patent Laid-Open No. Hei 7-244720 discloses the invention in which multiple systems own not only local clipboards, but also a common clipboard sharable by the systems. This invention makes it possible to implement an environment, for the case where multiple users work collaboratively, of allowing a use B to paste a certain content in a local file by referring to a common clipboard from a system B, the certain content having been copied in the common clipboard in a system A by a user A.

Further, there is another document management system using a Web browser (for example, Microsoft Internet Explorer (registered trademark)) on a client computer. Such a document management system allows users to use a Web browser to display a list of files or download files by accessing electronic files managed by the document management server. However, even if two Web browsers are launched (for example, a single Web browser is launched twice), the windows of the two Web browsers have no relationship. For this reason, in the case where a document management site providing a document management ASP service is accessed by two Web browsers individually launched, it is not possible to perform an operation based on the result of a certain operation Op, which has been performed on one of the Web browsers, on the other Web browsers. In short, collaborative operations between Web browser windows are not possible, unlike an example of the collaborative operations in which a particular document A is selected on one of the Web browsers (FIG. 4A: browser A) and then is pasted in any selected folder on the other web browser (FIG. 4B: browser B).

The following shows conceivable reasons for not allowing such collaborative operations between Web browser windows.

(1) There is no memory space sharable by Web browser windows.

A memory space sharable by windows needs to be prepared to achieve collaborative operations between windows in some way. For example, assume the case of: launching Internet Explorer (reregistered trademark); and then creating a new window by pressing down the "Ctrl" key and the "N" key at the same time while selecting Internet Explorer thus launched. In this case, a memory space called a session manageable on a server side can be shared by the windows thus created.

However, in the case where, one Internet Explorer has already launched, another Internet Explorer is additionally launched to access a server, a different session ID is assigned to the Web browser by the additionally-launched. For this reason, no session can be shared by the windows.

To put it another way, whether or not to share a session depends on how to create windows. As described above, a session is shared by windows when a new window is created and displayed through an operation on an already-launched application, but is not shared when a new window is displayed by additionally launching an application. Nevertheless, since the windows thus displayed look the same, an end user cannot easily know if the same session is assigned to the windows. Accordingly, it has not been easy to use session IDs in order to enable windows to share a memory space.

(2) It is difficult for a server to identify each of windows accessing the server.

In the case of a service provided on the Internet, an unspecified large number of users access the service by use of an unspecified large number of PCs. Accordingly, for the purpose of enabling collaborative operations between different windows, it is desirable to limit collaboratively-operable windows to some extent from the viewpoint of security.

However, general browsers are not originally designed to transmit a request including information identifying a window. Moreover, when a client PC accesses a server via a Proxy server, the server cannot obtain the IP address of the client PC. Since what the server can obtain is only the IP address of the Proxy server, the server cannot identify the client PC. In addition, among multiple Web browser windows operating on PCs, only windows purposely opened by the server itself using JavaScript or the like can be identified by the server whereas windows opened through users' operations cannot be identified by the server.

(3) There is no standard expansion technology for Web browser windows.

This problem can be solved on a client PC to some extent, if a plug-in technology such as ActiveX is used. However, when services are provided on a network, especially, on the Internet, it is assumed that end users use various environments such as Windows, UNIX and Mac OS. The technology such as ActiveX depends on the Windows OS environment and the browser, and accordingly does not support a multi-platform environment. In other words, it is desirable to solve this problem without using OS-dependent technologies.

As described above, a system using a document management service via Web browsers is designed based on the assumption that all needed operations are performed in a single window, and thus has a problem that the system does not enable collaborative operations between two windows.

SUMMARY OF THE INVENTION

An object of the present invention is to solve the foregoing problem. To solve the foregoing problem, the present invention is configured as follows.

In the first aspect of the present invention, there is provided an information processing apparatus that manages an item to be operated, comprising: registering means that registers association information for associating a window of a first Web browser with a window of a second Web browser that are to share information, according to an instruction of a user; storage means that, if the user orders a first operation for an item from the first Web browser, stores information of the operation-ordered item; and processing means that, if the user orders a second operation from the second Web browser, executes the second operation for the item based on the information of the operation-ordered item stored by the storage means and the association information registered by the registering means.

In the second aspect of the present invention, there is provided an information processing method used in an information processing apparatus that manages an item to be operated, comprising: a registering step of registering association information for associating a window of a first Web browser with a window of a second Web browser that are to share information, according to an instruction of a user, a storing step of, when the user orders a first operation for an item from the first Web browser, storing information of the operation-ordered item; a processing step of, when the user orders a second operation from the second Web browser, executing the second operation for the item based on the information of the operation-ordered item stored in the storing step and the association information registered in the registering step.

In the third aspect of the present invention, there is provided a computer readable storage medium that stores a computer program for causing a computer to execute steps of: registering association information for associating a window of a first Web browser with a window of a second Web browser that are to share information, according to an instruction of a user; when the user orders a first operation for an item from the first Web browser, storing information of the operation-ordered item; and when the user orders a second operation from the second Web browser, executing the second operation for the item based on the information of the operation-ordered item stored in the storing step and the association information registered in the registering step.

The present invention enables collaborative operations between windows, such as a collaborative operation of: opening two Web browser windows; storing a file displayed in an item list on one of the windows; and then making a copy of the file into a folder displayed on the other window.

Further features of the present invention will become apparent from the following description of exemplary embodiments (with reference to the attached drawings).

BRIEF DESCRIPTION OF THE DRAWINGS

FIG. 8 is a diagram showing one example of management items managed in item information DB 715 in the first embodiment of the present invention;

DESCRIPTION OF THE EMBODIMENTS

First Embodiment

First of all, description will be provided for a document management system to which the present invention is applicable.

Figure 1:
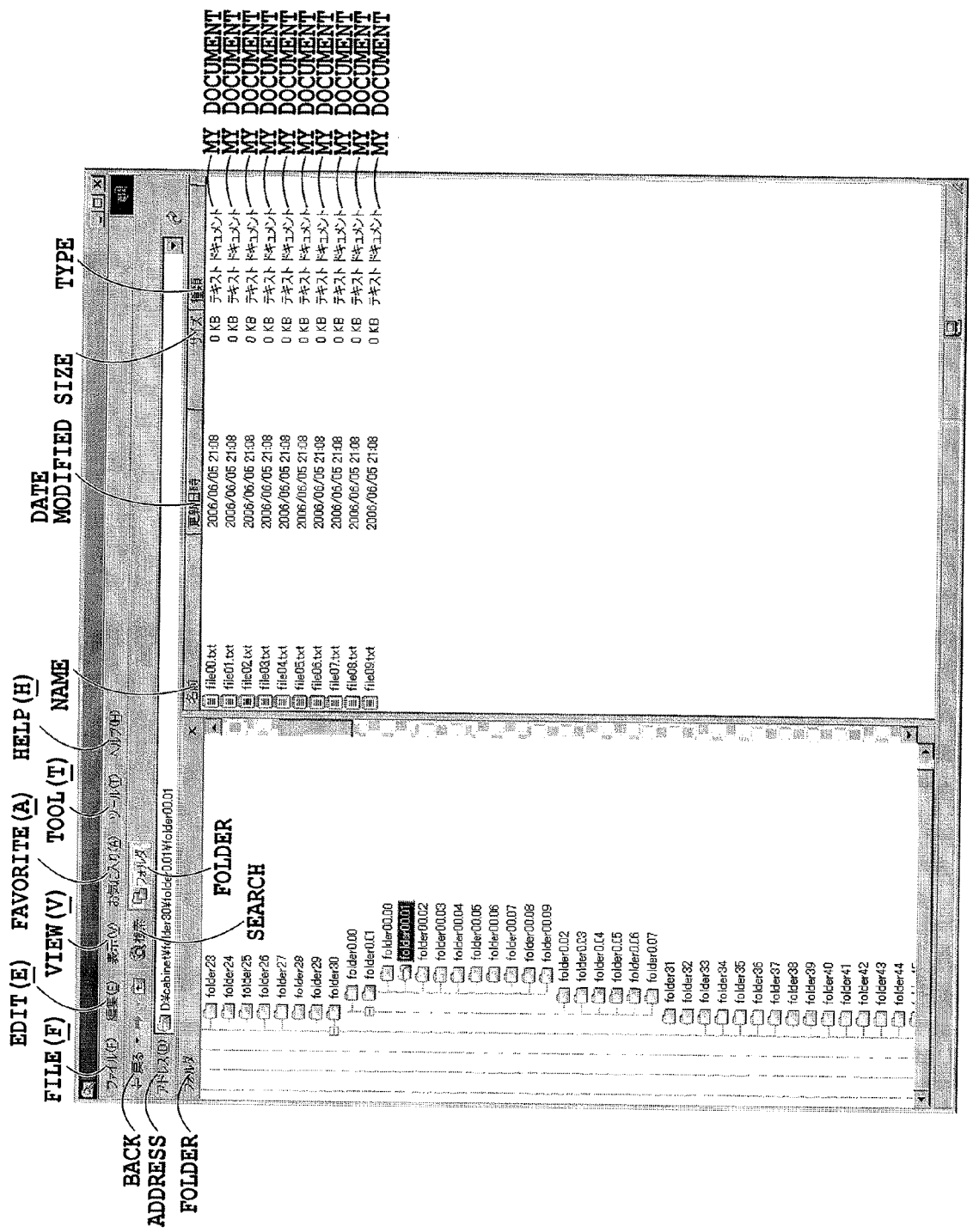
FIG. 1 is a diagram for explaining a conventional operation on a Windows Explorer for file sharing.
Figure 2:
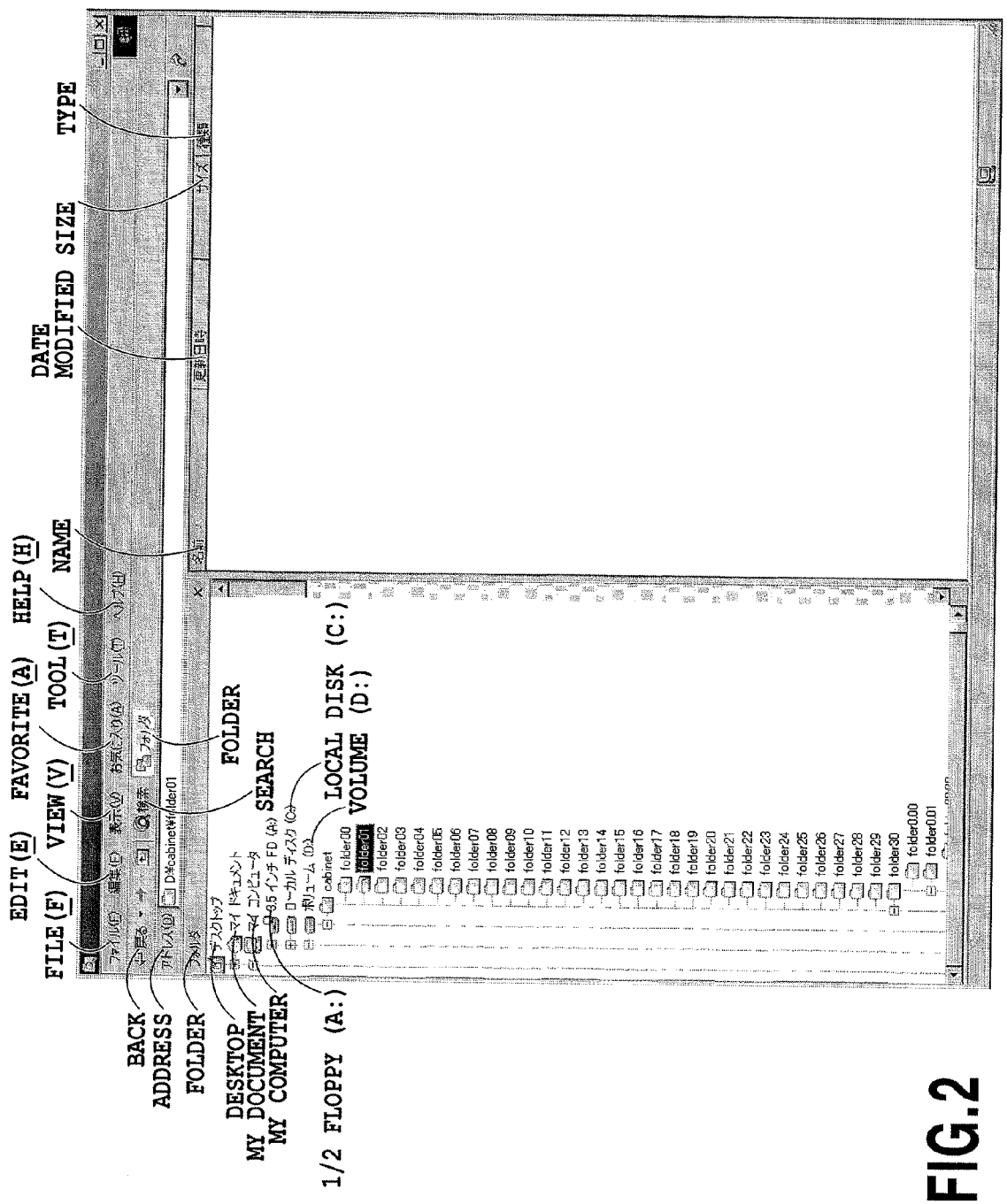
FIG. 2 is a diagram for explaining a conventional operation on a Windows Explorer for file sharing.
Figures 3, 3A, 3B:
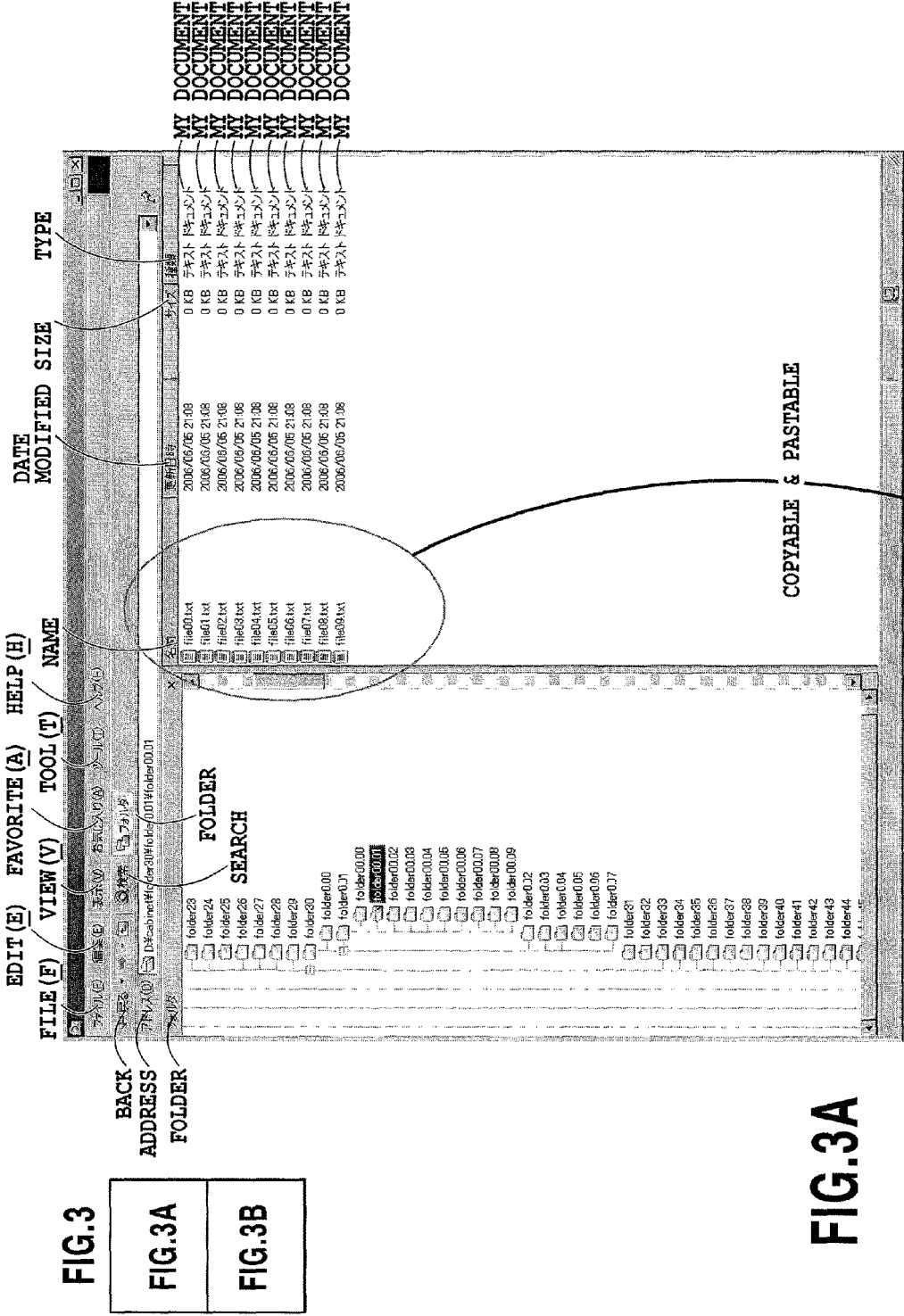
FIG. 3 is a diagram showing the relationship of FIGS. 3A and 3B.
FIG. 3A is a diagram for explaining conventional collaborative operations between multiple Windows Explorers for file sharing.
FIG. 3B is a diagram for explaining conventional collaborative operations between multiple Windows Explorers for file sharing.
Figure 3B:
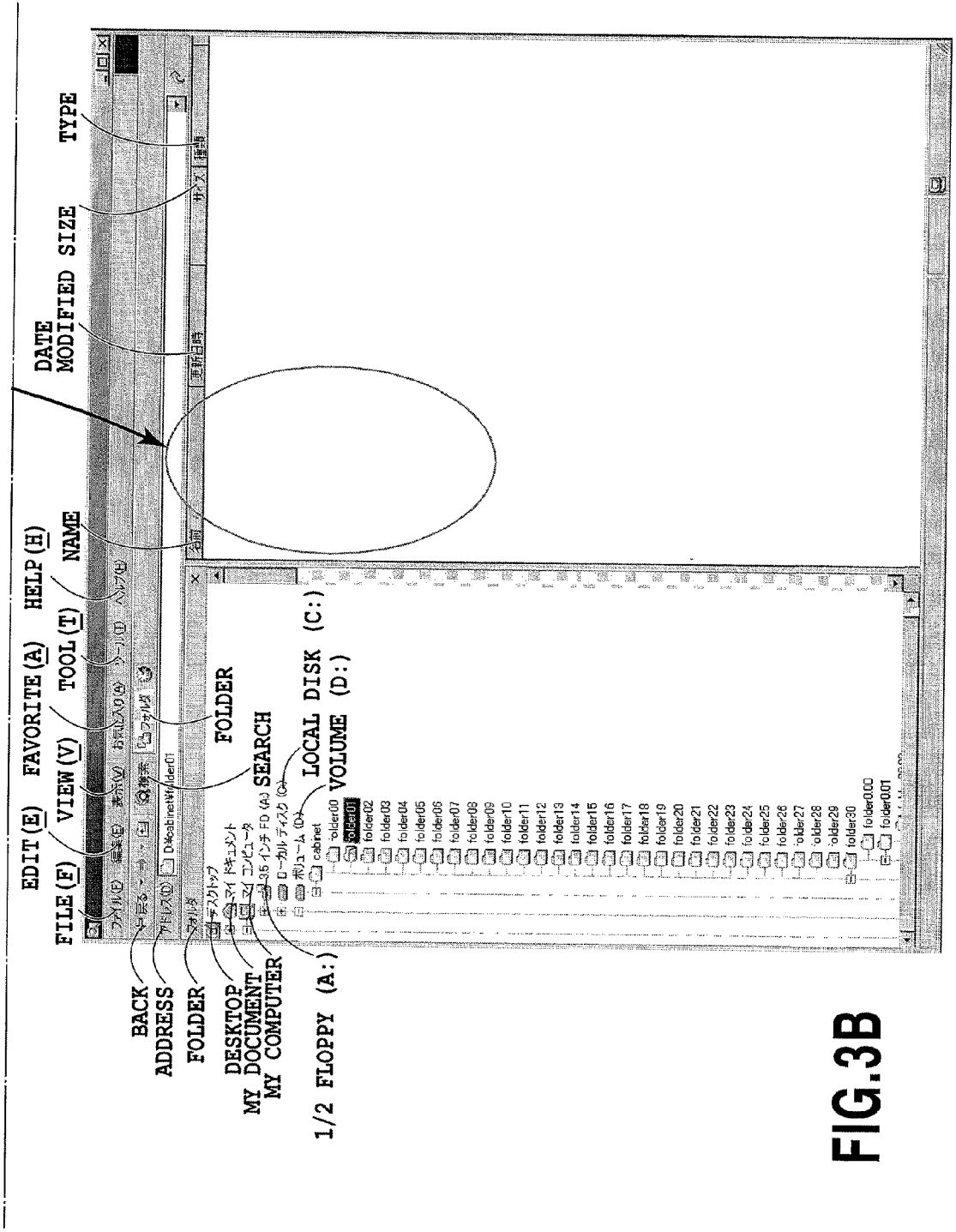
Figures 4, 4A:
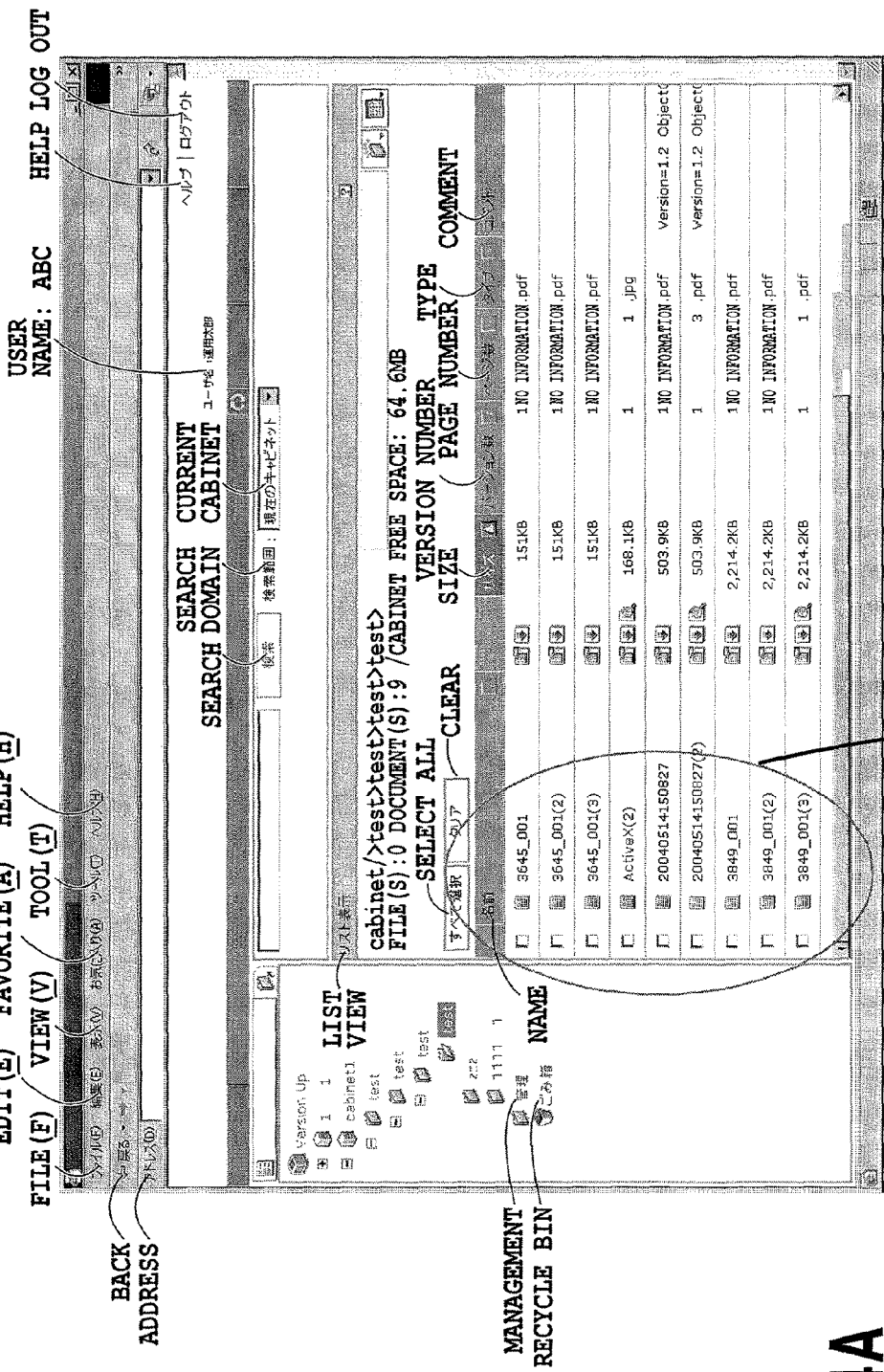
FIG. 4 is a diagram showing the relationship of FIGS. 4A and 4B.
FIG. 4A is a diagram for explaining conventional collaborative operations between windows in a document management system which uses a Web browser.
Figure 4B:
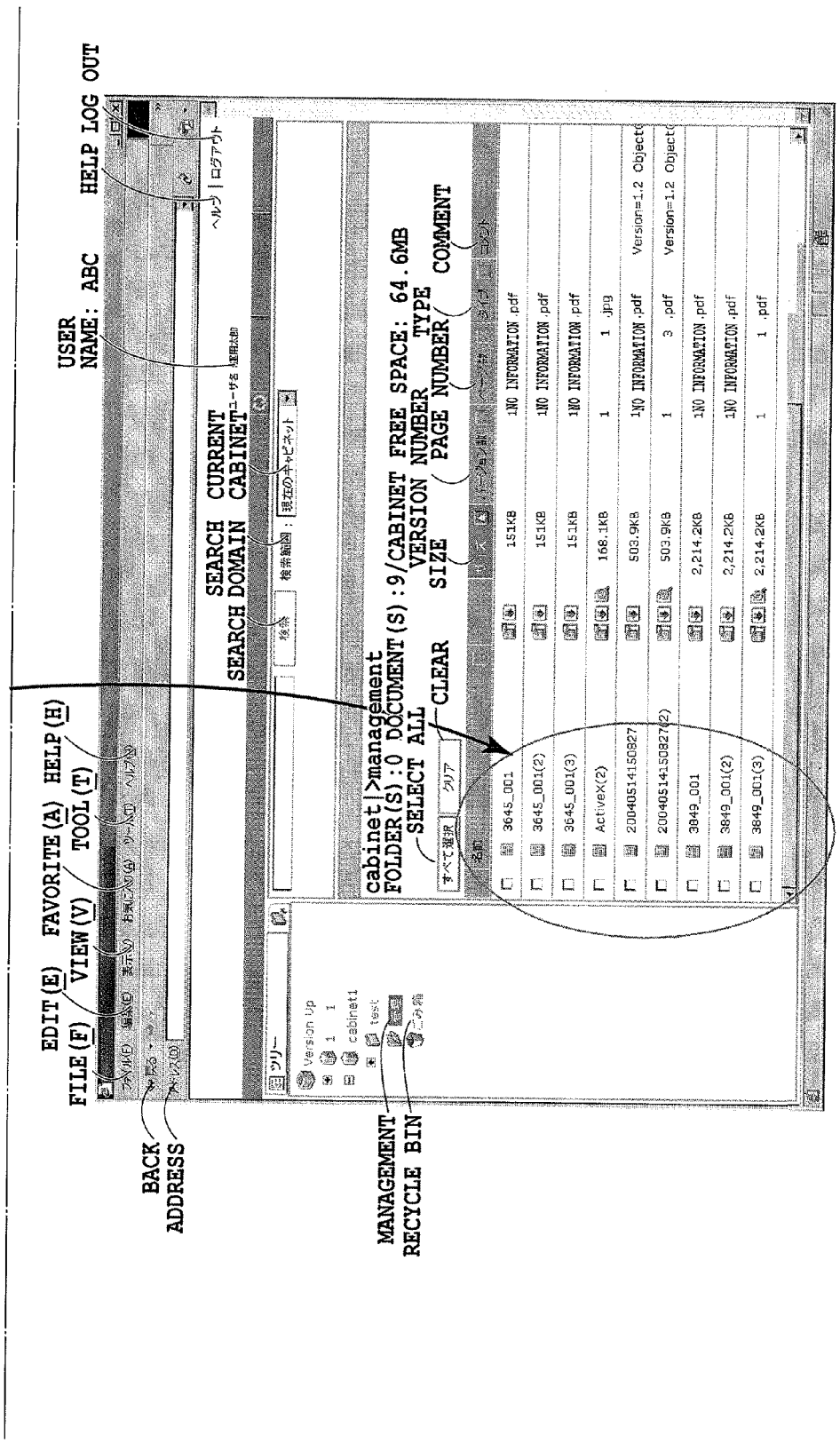
FIG. 4B is a diagram for explaining conventional collaborative operations between windows in a document management system which uses a Web browser.
Figure 5:
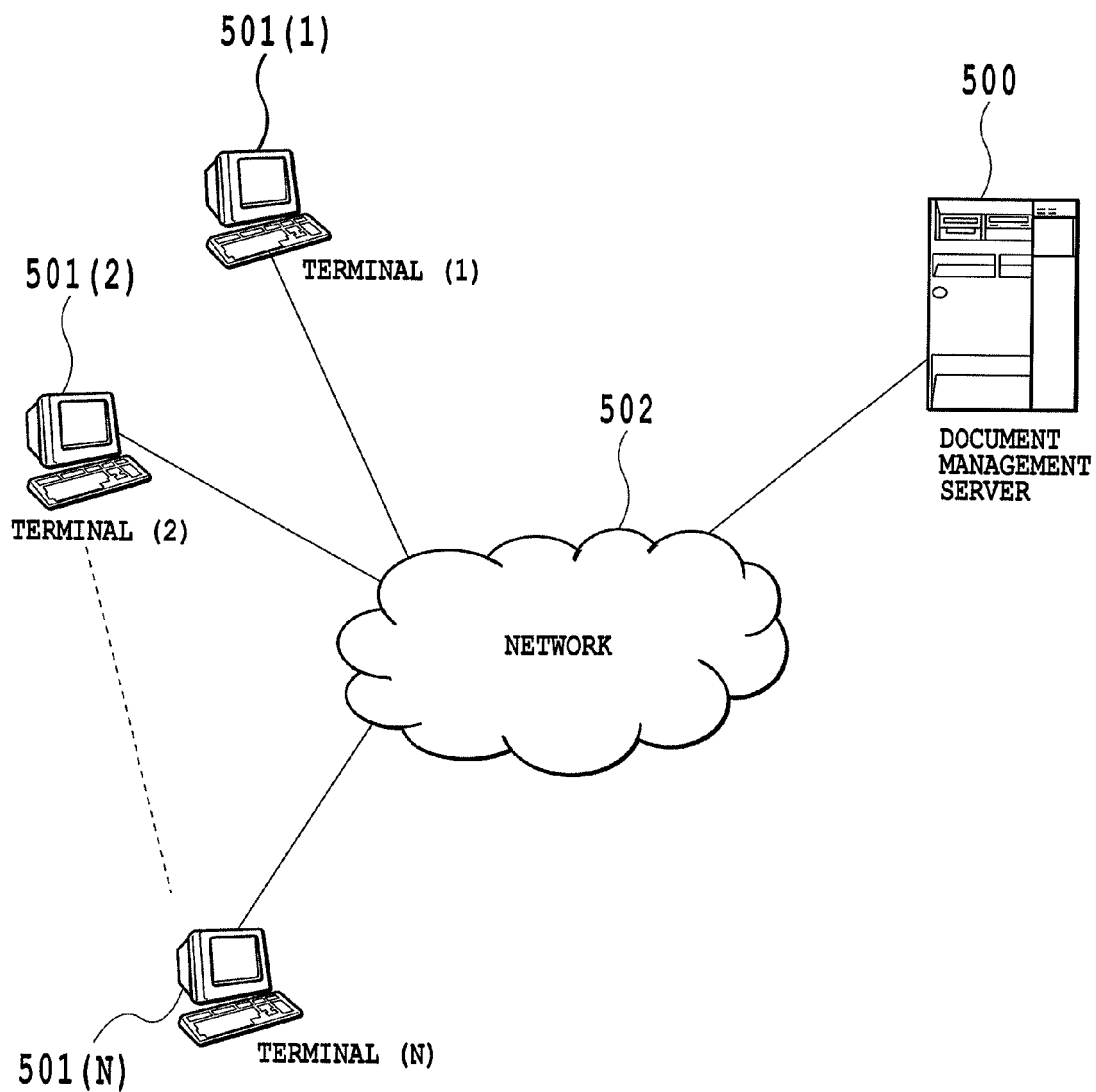
FIG. 5 is a diagram for explaining a document management system to which the present invention is applicable according to a first embodiment of the present invention.

FIG. 5 is a system configuration diagram of the document management system to which the present invention is applicable.

As shown in FIG. 5, a document management server 500 and multiple client terminals 501(1), 501(2), . . . , 501(N) such as PCs are connected to each other via a network 502. The network 502 may be any other network system such as the Internet and an intranet. In addition, for simplification of the description, a term, a client terminal 501(X) is used to indicate anyone of the multiple client terminals 501(1), 501(2), . . . , 501(N), as needed.

The document management system to which the present invention is applicable enables the client terminal 501(X) to perform operations on the document management server 500, such as registering or deleting an electronic file as a document as well as searching for a registered document. As in the case with the Windows file system, the document management system managed by the document management server 500 is capable of managing folders as nodes and documents as leaf nodes in a hierarchic structure. For example, the document management system allows a user to create a folder and store a document in the folder.

Next, description will be provided for the document management server 500 and the client terminal 501(X) constituting the document management system to which the present invention is applicable.

Figure 6:
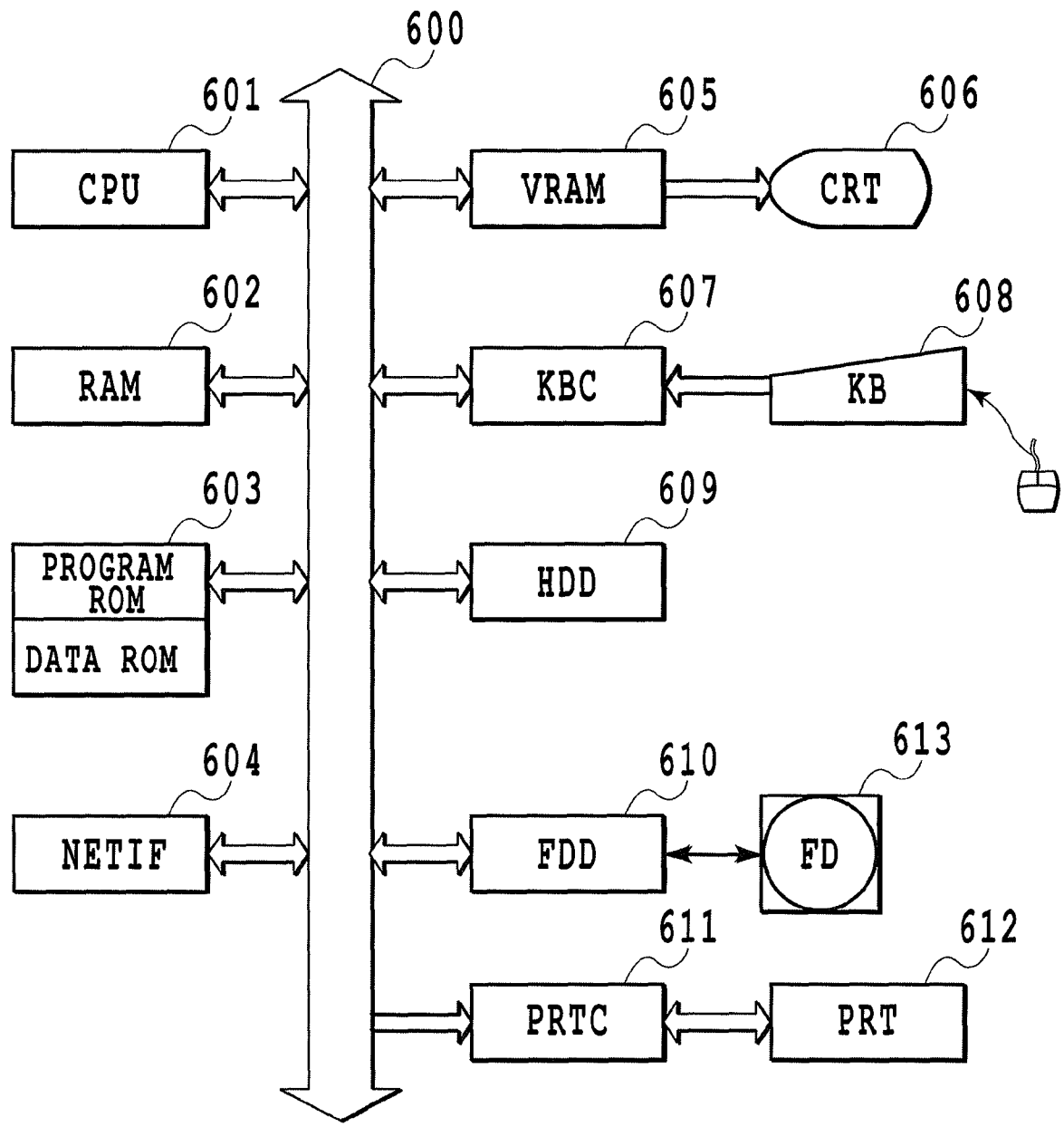
FIG. 6 is a diagram showing specific configuration examples of a document management server 500 and a client terminal 501(X) according to the first embodiment of the present invention.

FIG. 6 is a diagram showing a specific configuration example of the document management server 500 and the client terminal 501(X).

In FIG. 6, reference numeral 601 denotes a Central Processing Unit (called a CPU below) that performs arithmetic operations and control of an information processing apparatus.

Reference numeral 602 denotes a Random Access Memory (called a RAM below). The RAM 602 functions as a main memory of the CPU 601, i.e., as an execution area and data area for executed programs.

Reference numeral 603 denotes a Read Only Memory (called a ROM below) for storing operation processing procedures of the CPU 601. The ROM 603 includes a program ROM storing basic software (Operation System (OS)) that is a system program for performing device control in the information processing apparatus, and a data ROM storing information and the like necessary for operating the system. Instead of the ROM 603, some information processing apparatus uses a HDD 609, which will be described later.

Reference numeral 604 denotes a network interface (called a NETIF below). The NETIF 604 controls data transfer between information processing apparatuses via a network, and diagnoses a connection state.

Reference numeral 605 denotes a video RAM (called a VRAM below). In the VRAM 605, images to be displayed on a display screen of a below-described CRT 606, which shows an operation status of the information processing apparatus, are expanded during display control.

Reference numeral 606 denotes a display device (called a CRT below) such as a display.

Reference numeral 607 denotes a controller (called KBC below) for controlling input signals from an external input device 608.

Reference numeral 608 denotes an external input device (called a KB below) for accepting operations performed by a user. For example, a pointing device such as a keyboard or a mouse is used as the external input device.

Reference numeral 609 denotes a hard disk drive (called an HDD below). The HDD 609 is used to store application programs and various kinds of data. In this embodiment, the application program means computer programs or the like for causing a computer to function as each of processing units in this embodiment. For example, the document management server 500 stores therein a computer program for causing a computer to function as the document management server of the document management system.

Reference numeral 610 denotes an external input/output device (called a FDD below). The FDD 610 is, for example, a device such as a floppy disk drive or a CD-ROM drive. This device performs input/output operations on corresponding removable disks, and is used to, for example, read out the foregoing application program from a medium.

Reference numeral 613 denotes a removable data recording medium (removable medium) (called a FD below), such as a magnetic recording medium, an optical recording medium, a magneto-optical recording medium, and a semiconductor recording medium, from which data is read out by the FDD 610.

Here, the magnetic recording medium is a floppy disk or an external hard disk, for example. In addition, for example, the optical recording medium is a CD-ROM, the magneto-optical recording medium is a MO, and the semiconductor recording medium is a memory card. Incidentally, the application program or data stored in the HDD 609 can be stored in the FD 613 and thus used.

Reference numeral 611 denotes a controller (called a PRTC below) for controlling output signals to be transmitted to a PRT 612, which will be described later.

Reference numeral 612 denotes a printing device (called a PRT below). As the PRT 612, a Laser Beam Printer (LBP) or the like is used, for example.

Reference numeral 600 denotes transmission buses (an address bus, a data bus, an input/output bus and a control bus) for connecting the foregoing units to each other.

Hereinafter, the configuration of the document management server according to the present invention will be described.

Figure 7:
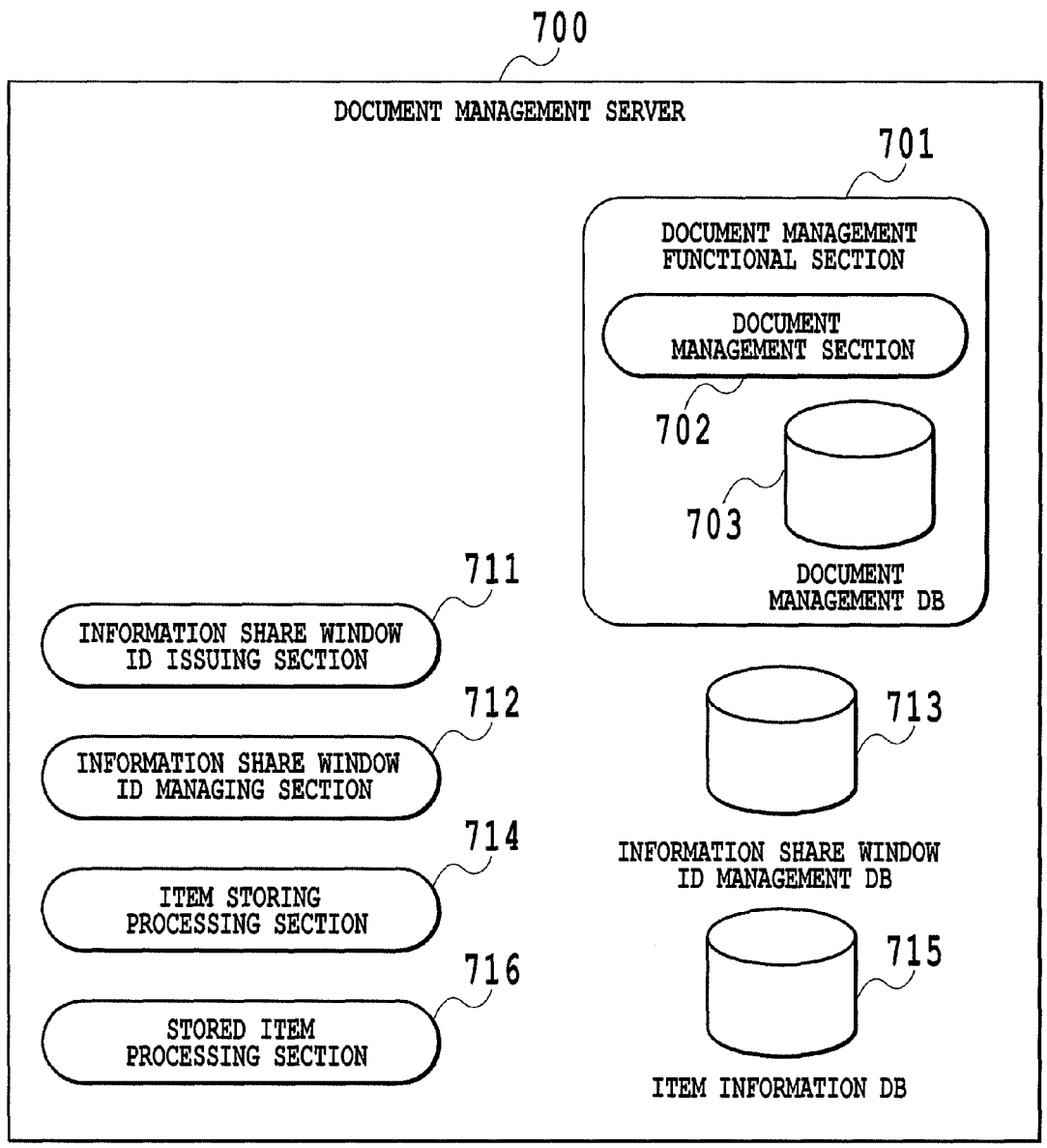
FIG. 7 is a conceptual diagram showing the configuration of the document management server that enables collaborative operations between multiple Web browsers according to the first embodiment of the present invention.

FIG. 7 is a conceptual diagram showing the architecture of the document management server to which the present invention is applicable, that is, the document management server that enables collaborative operations between multiple Web browsers according to the first embodiment of the present invention. In this embodiment, the computer of the document management server is caused to function as each of processing units in FIG. 7 by executing the computer program. However, this is not only the way to implement the document management server, but part or all of the processing units may be configured of hardware.

Reference numeral 700 denotes a main body of the document management server 500.

Reference numeral 701 denotes a document management functional section for controlling a basic document management function in the document management server 500. The document management functional section 701 registers and manages documents and electronic files.

Reference numeral 702 denotes a document management section included in the document management functional section 701. The document management section 702 provides functions such as document registration, document movement, document copy and document search, in accordance with requests from users Reference numeral 703 denotes a document management DB included in the document management functional section 701. The document management DB 703 is a database that is used to manage electronic files and folders of registered documents, and attributes of documents.

Reference numeral 711 denotes an information share window ID issuing section that issues an ID for identifying a window of a Web browser on the PC (terminal) that transmits a certain request (here, a login request is used as an example) for information sharing. Upon receipt of a login request, the document management server 700 issues an information share window ID to an access by means of the information share window ID issuing section 711. The information share window ID issuing section 711 assigns the information share window ID to the Web browser (window) when logging in. Contents which are exchanged between the PC and the document management server will be described later.

Reference numeral 712 denotes an information share window ID managing section. According to a certain request from a Web browser (window) to share information between the windows, the information share window ID managing section 712 sets an information share window ID assigned to the Web browsers (windows) that share information. With this assignment, two or more windows can share (commonly use) an information share window ID. Then, collaborative operations can be performed on the windows sharing the information share window ID.

Reference numeral 713 denotes an information share window ID management DB that is a database for managing the information share window ID of the Web browser windows sharing information. The information share window ID managing section 712 sets and registers the information share window ID in the information share window ID management DB 713.

Reference numeral 714 denotes an item storing processing section (storage control means). The item storing processing section 714 executes processing for temporarily storing item information in the below-described item information DB. Here, the item information indicates an item specified on each Web browser (window) by a user.

Reference numeral 715 denotes an item information DB that is a database in which the item storing processing section 714 stores item information of the item which is designated by the user on the Web browser (window). The details of the item information DB 715 will be described later.

Reference numeral 716 denotes a stored item processing section. The stored item processing section 716 executes processing corresponding to an operation such as a copy operation (copy & paste) and a move operation (cut & paste) for the item whose item information is stored in the item information DB by the item storing processing section 714.

Hereinafter, management items managed in the item information DB 715 will be described with reference to FIG. 8.

Reference numeral 800 denotes an item information management table in the item information DB 715.

Reference numeral 801 denotes an item ID that indicates an item designated by a user's operation. A unique item ID is assigned to each document or folder managed in the document management functional section 701. Identifiers that the document management functional section 701 uses for managing documents and folders may be used as the item IDs. By managing the item IDs 801, it is possible to uniquely identify a document or folder. The stored item processing section 716 designates the item ID 801 to instruct the document management functional section 701 to perform an operation on the document having the item ID 801.

Reference numeral 802 denotes an item name that is a document name or folder name that a user designates when registering a document or creating a folder.

Reference numeral 803 denotes an operating user that is information identifying a user who has made an instruction to store the item information.

Reference numeral 804 denotes a window ID (information share window ID) that is information uniquely identifying a window that the user has used when making the instruction to store the item information.

Reference numeral 805 denotes a simultaneous selection ID that is information uniquely identifying a timing at which the user has made an instruction. For example, when an instruction is made to store multiple item information A, B and C at a certain timing, the same simultaneous selection IDs are issued and assigned to the item information A, B and C, respectively. Moreover, when an instruction to store an item information E is made after an instruction to store an item information D is made, different simultaneous selection IDs are assigned to the item information D and E, respectively.

Reference numeral 806 denotes a lock flag that is a flag indicating whether or not to lock the item. When the item is locked, the lock flag is used to make control to prohibit another user from changing the item information of the locked item.

Figure 9:
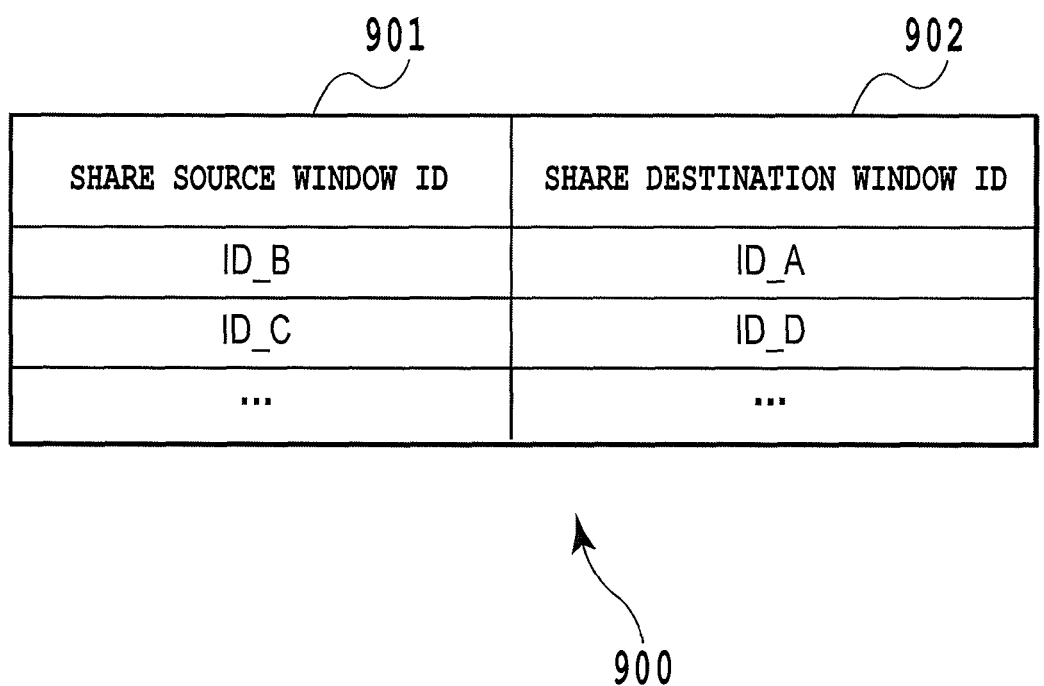
FIG. 9 is a diagram showing one example of entries managed in an information share window ID management DB 713 in the first embodiment of the present invention.

Next, management items managed in the information share window ID management DB 713 will be described with reference to FIG. 9. FIG. 9 shows one example of a table for managing the information share window ID.

Reference numeral 900 denotes an information share window ID management table in the information share window ID management DB 713.

Reference numeral 901 denotes a share source window ID (the information share window ID serving as a share source) that is an ID uniquely assigned to each window of the logged-in Web browser every time the user logs in. In this embodiment, the share source window ID is registered in this information share window ID management table when the windows start sharing.

Reference numeral 902 denotes a share destination window ID that indicates the information share window ID of a window as a share destination that shares information with a window having the information share window ID 901 of the share source. In this way, the share source window ID 901 and the share destination window ID 902, which is the information share window ID of the share destination, are managed in association with each other.

Figure 10:
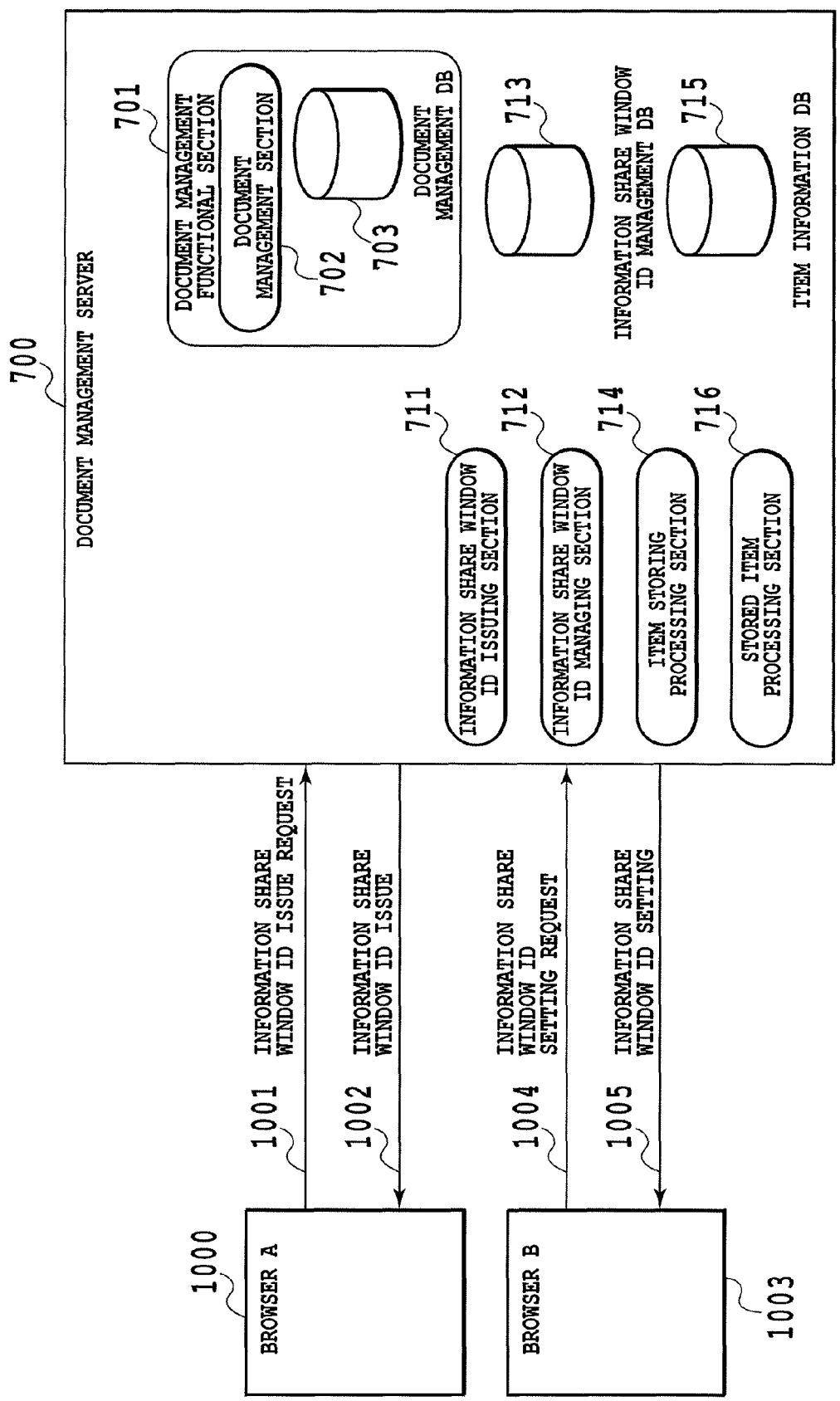
FIG. 10 is a conceptual diagram for explaining a mechanism with which multiple Web browsers share the information share window ID in the first embodiment of the present invention.

Hereinafter, with reference to FIG. 10, description will be given for a mechanism with which multiple Web browsers share the information share window ID. FIG. 10 is a conceptual diagram for explaining this mechanism.

Reference numeral 1000 denotes a Web browser (browser A: a first Web browser). The Web browser 1000 transmits an information share window ID issue request 1001 to the document management server 700.

Upon receipt of the information share window ID issue request 1001, the document management server 700 issues a unique ID, and returns the unique ID as an information share window ID issue 1002 to the window of the Web browser as a request source. As for this information share window ID issue request 1001, the Web browser 1000 is configured to transmit the information share window ID issue request 1001 to the document management server 700 whenever the Web browser 1000 starts running and then accesses the document management server. Instead, the Web browser 1000 may be configured to transmit the information share window ID issue request 1001 together with a login request for user authentication.

Reference numeral 1003 denotes a Web browser as similar to reference numeral 1000. Now, assume that the Web browser 1003 (browser B: a second Web browser) has already transmitted the information share window ID issue request 1001 to the document management server 700 and received the information share window ID issue 1002. The description herein is based on the case of implementing collaborative operations between the Web browsers 1003 and 1000. Now, suppose that a user performs an operation on the web browser 1003 to input the ID of the Web browser 1000 and to instruct the web browser 1003 to transmit an information share window ID setting request. In response to this instruction, the Web browser 1003 transmits an information share window ID setting request 1004 to the document management server 700. The information share window ID setting request 1004 includes the information share window ID issued to the Web browser 1000 to be used as the share destination. Upon receipt of the information share window ID setting request 1004, the document management server 700 makes a setting (its detail will be described later) for allowing the Web browser 1003 and the Web browser 1000 to share information. The document management server 700 returns an information share window ID setting 1005 as a response to the information share window ID setting request 1004.

Next, the mechanism shown in FIG. 10 will be described in more detail by referring to FIG. 11.

Figure 11:
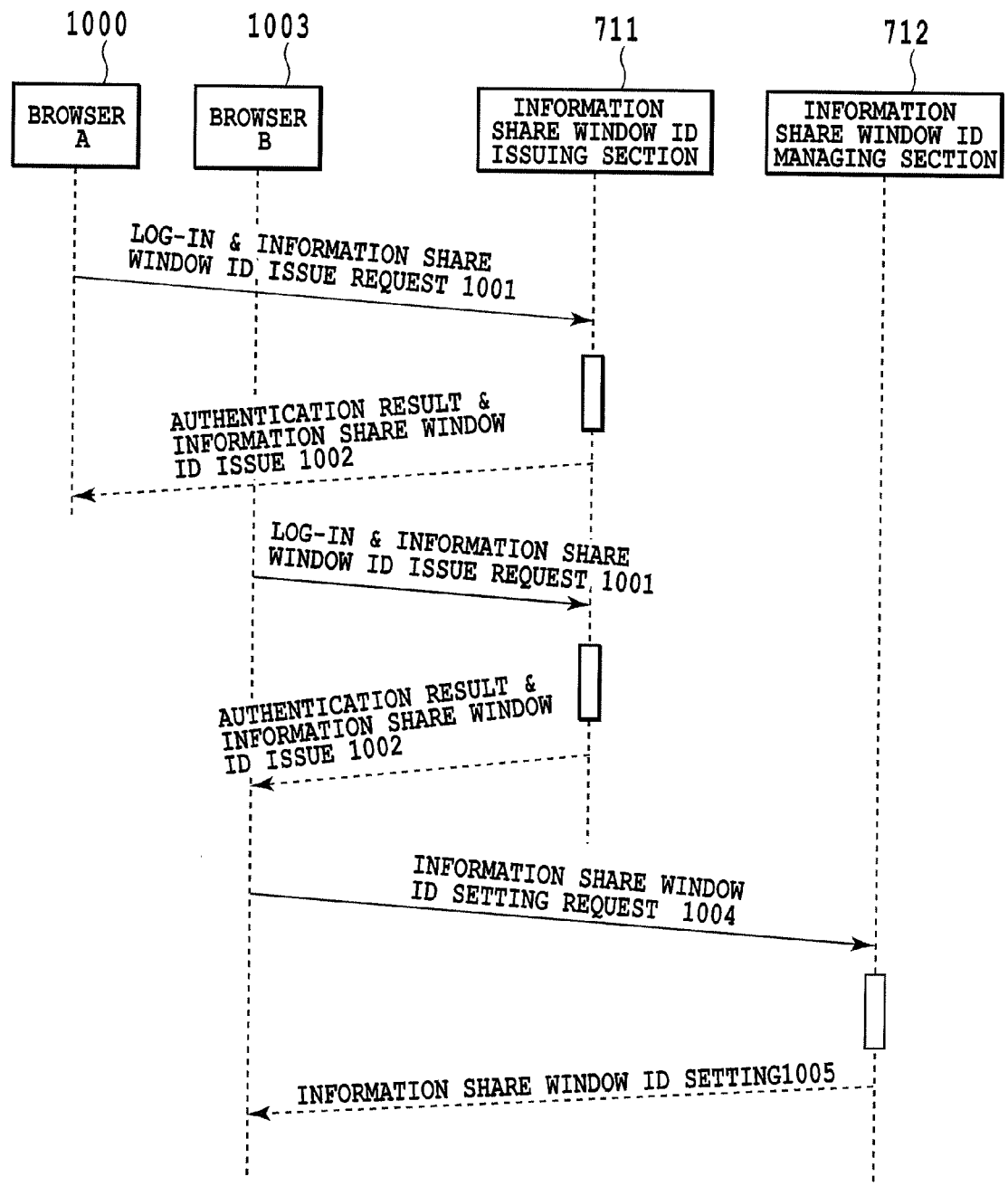
FIG. 11 is a sequence diagram for explaining the mechanism with which the multiple Web browsers share the information share window ID in the first embodiment of the present invention.

FIG. 11 is a sequence diagram for explaining, in more detail, the mechanism in FIG. 10 with which the multiple Web browsers share the information share window ID.

To begin with, the Web browser 1000 (browser A) transmits the information share window ID issue request 1001 together with a login request.

In the document management server 700 having received the information share window ID issue request 1001, the information share window ID issuing section 711 issues a unique information share window ID to the Web browser 1000 (browser A).

The document management server 700 returns the issued information share window ID as the information share window ID issue 1002 to the Web browser 1000 (browser A).

Figure 12A:
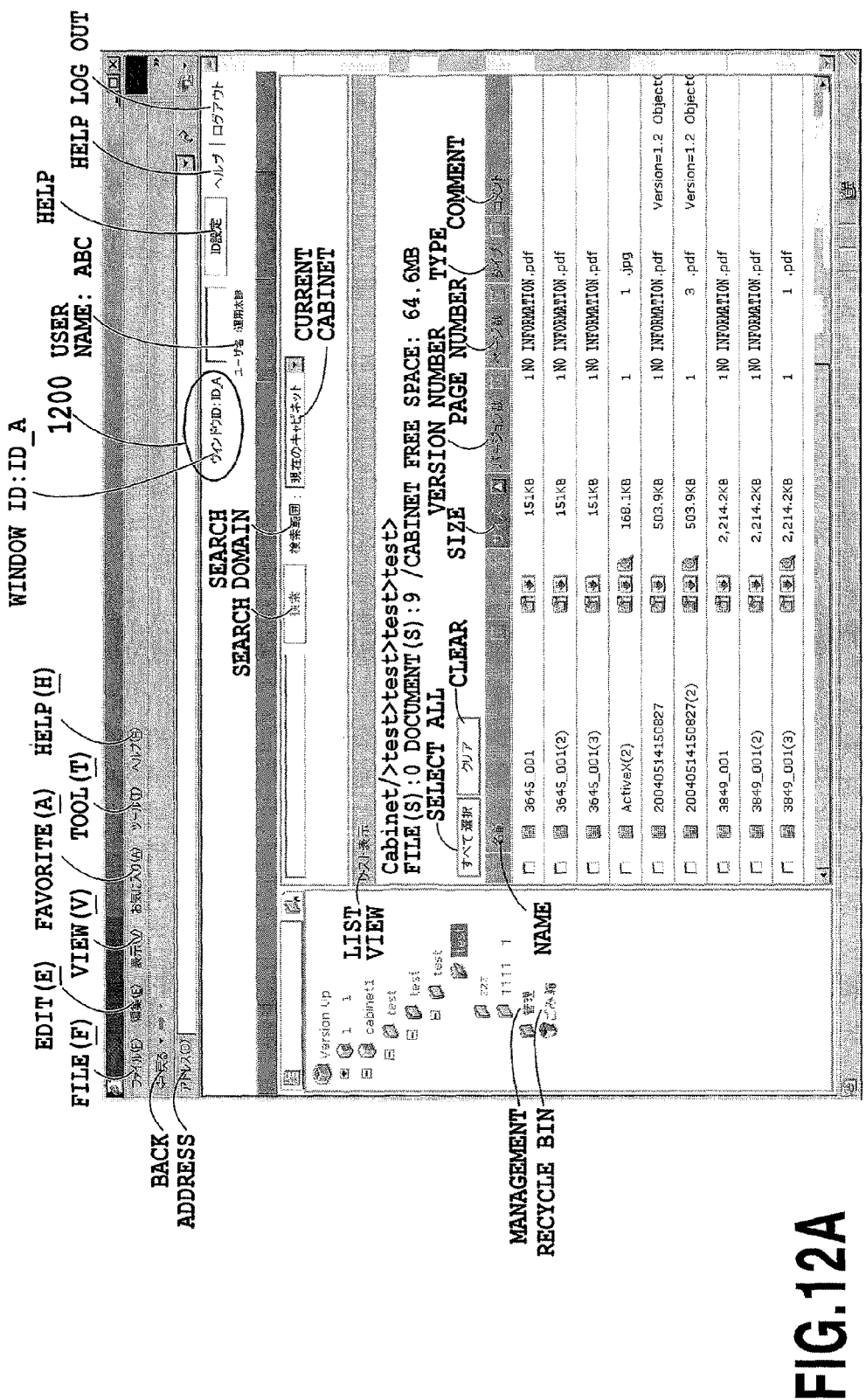
FIGS. 12A and 12B show display examples of the information share window IDs in the first embodiment of the present invention.

Upon receipt of the information share window ID issue 1002, the Web browser 1000 (browser A) displays the information share window ID as shown in FIG. 12A, and thereby notifies the user of the information share window ID. Similarly, the Web browser 1003 (browser B) also transmits the information share window ID issue request 1001 together with a login request, and displays the issued information share window ID to notify the user of the information share window ID.

Figure 12B:
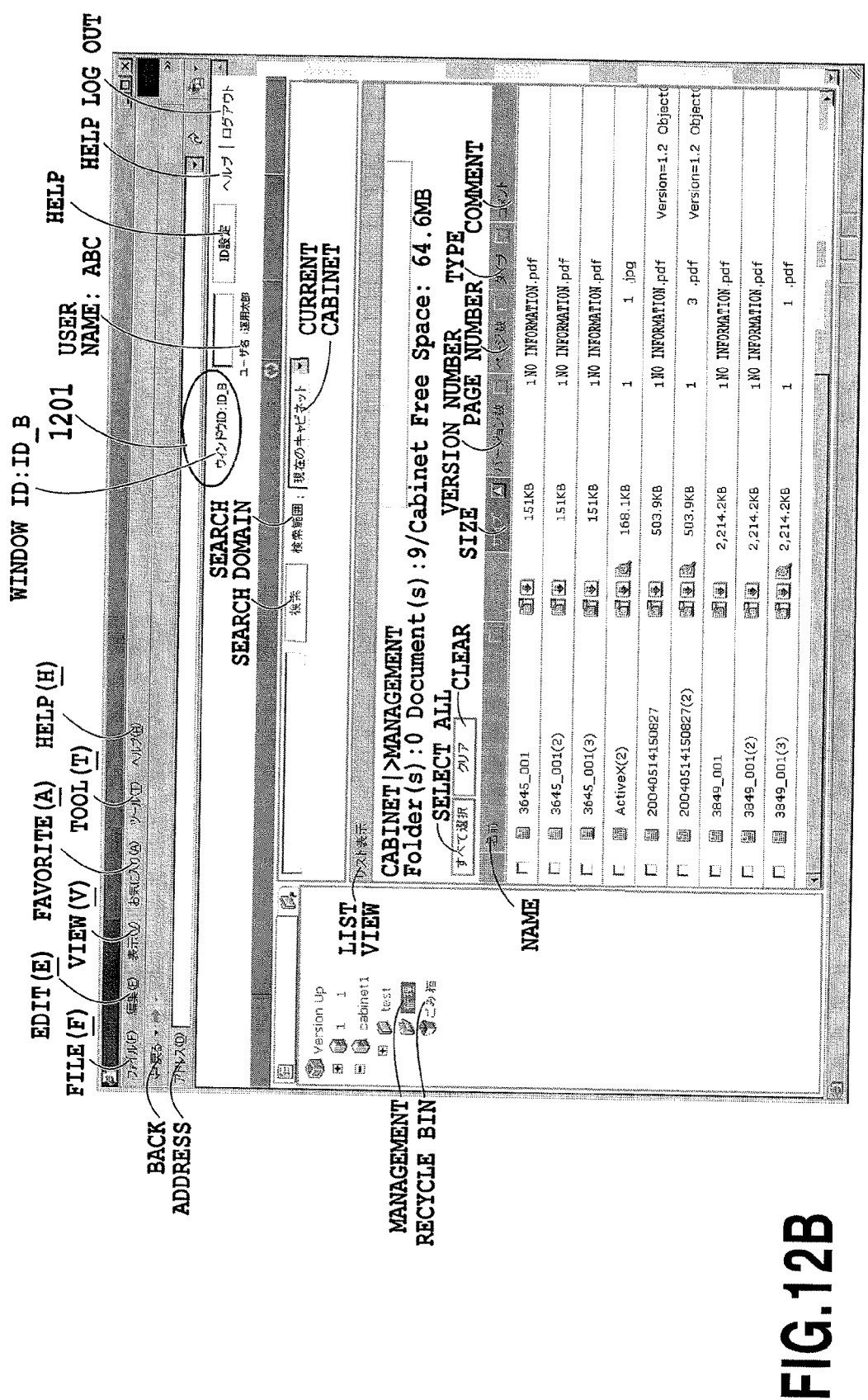

FIGS. 12A and 12B show display examples of the information share window IDs.

FIG. 12A shows that an information share window ID 1200 ("ID_A" in FIG. 12A) is displayed on the web browser 1000 (browser A). In contrast, FIG. 12B shows that an information share window ID 1201 ("ID_B" in FIG. 12B) is displayed on the Web browser 1003 (browser B).

Subsequently, description will be given for processing executed in the server side to enable information sharing in response to the requests respectively transmitted from the Web browser 1000 (browser A) and the Web browser 1003 (browser B).

As shown in FIG. 11, when the user inputs the information share window ID issued to the Web browser 1000 (browser A) and then makes a transmission request in the Web browser 1003, the Web browser 1003 transmits the information share window ID setting request 1004. The information share window ID setting request 1004 includes the information of the information share window IDs issued to the browser A and the browser B, respectively.

Upon receipt of the information share window ID setting request 1004, the document management server 700 makes a setting in the information share window ID management DB 713 such that "the Web browser 1003 (browser B) and the Web browser 1000 (browser A) can share information." More specifically, the information share window ID of the Web browser 1003 and the information share window ID of the Web browser 1000 are registered in the information share window ID management DB 713 in association with each other, as the share source window ID and the share destination window ID, respectively.

After performing the setting processing to the information share window ID management DB 713, the document management server 700 returns the information share window ID setting 1005 to the Web browser 1003 (browser B), and notifies the Web browser 1003 of the processing completion.

Figure 13A:
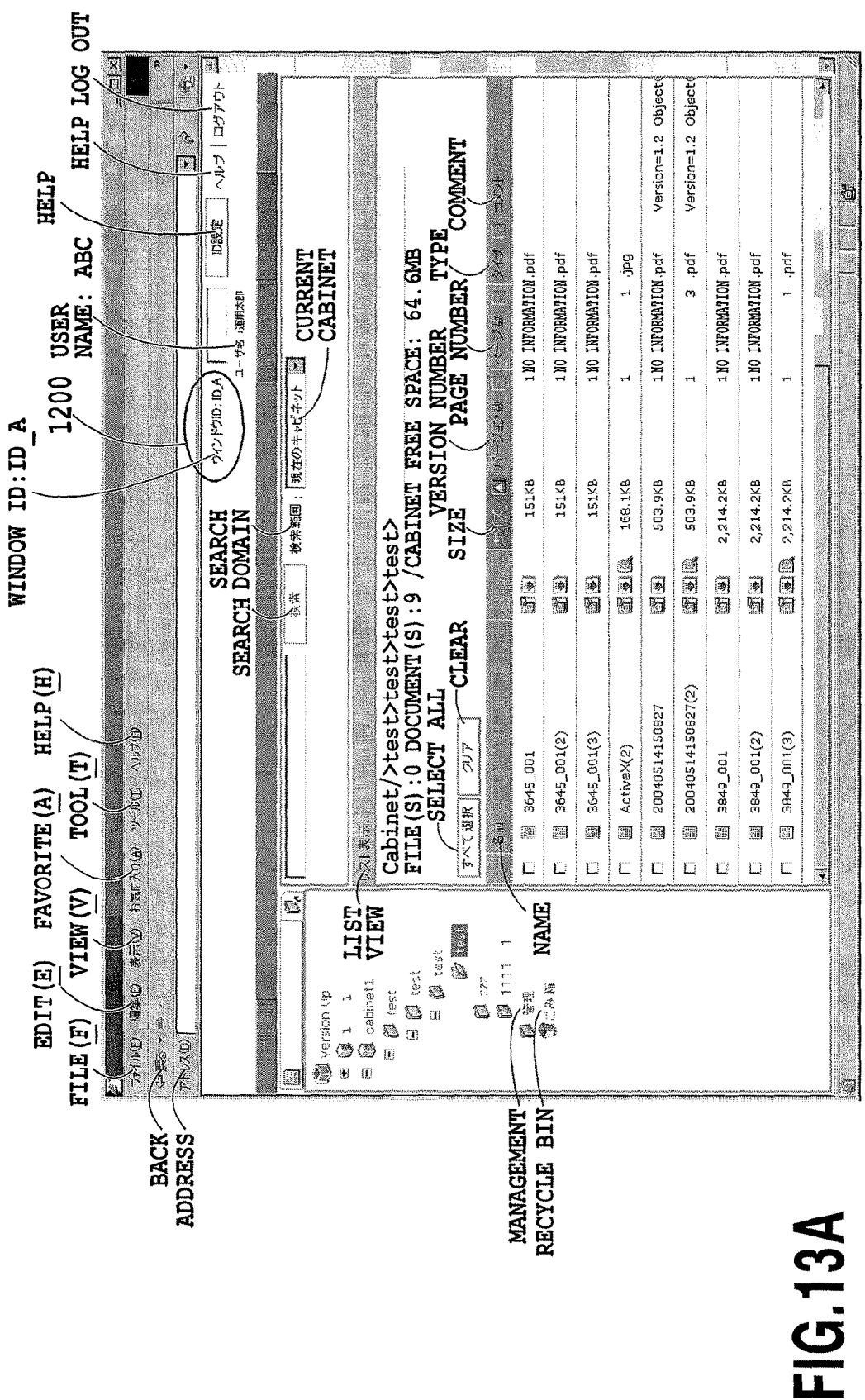
FIGS. 13A and 13B are diagrams for explaining a setting of the information share window IDs in the first embodiment of the present invention.
Figure 13B:
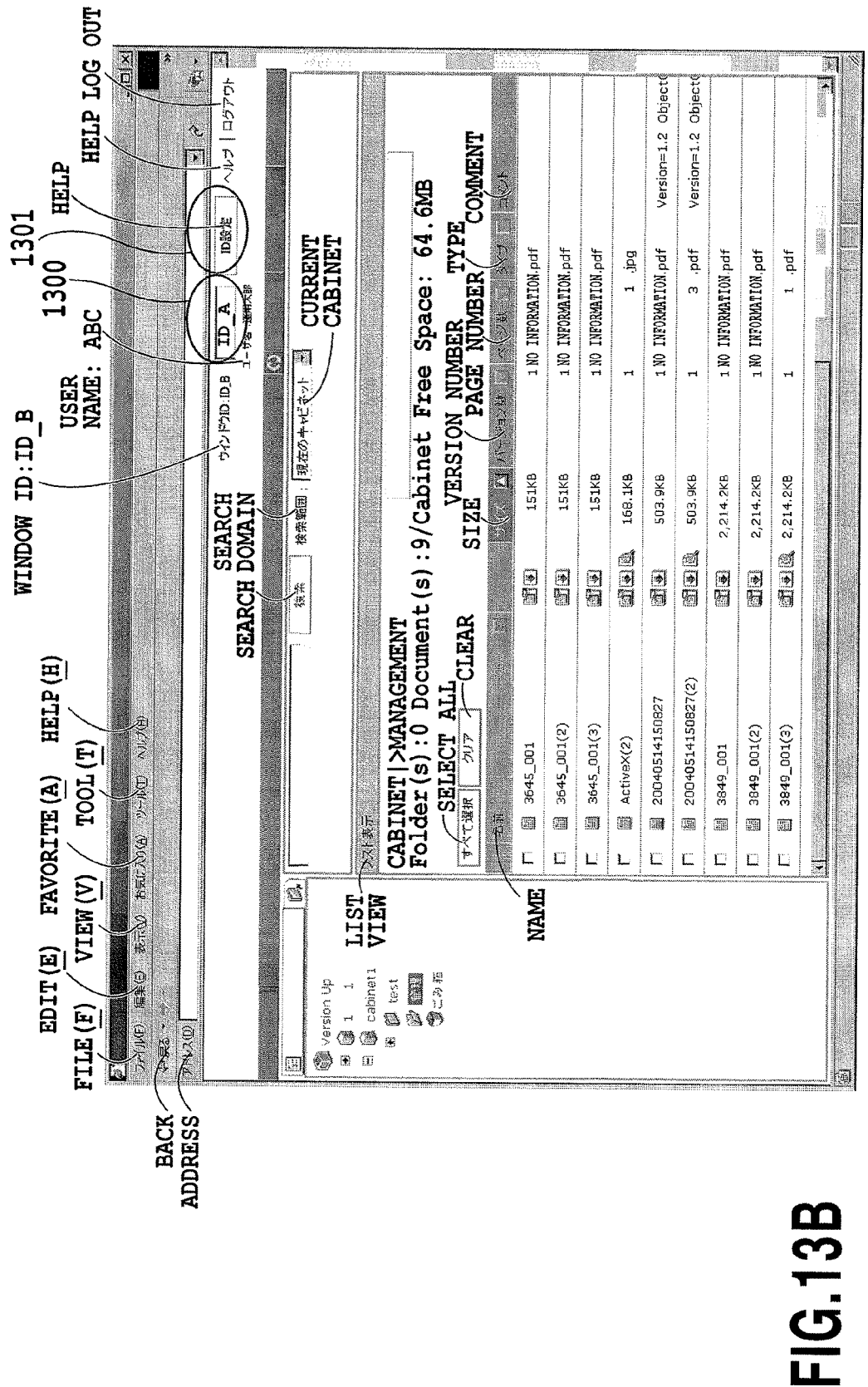

FIG. 13B shows that, on the Web browser 1003 (browser B), the information share window ID 1200 (ID_A) is inputted in an information share window ID setting area 1300 in order to set the information share window ID. More detailed description will be given based on this drawing.

Figure 14A:
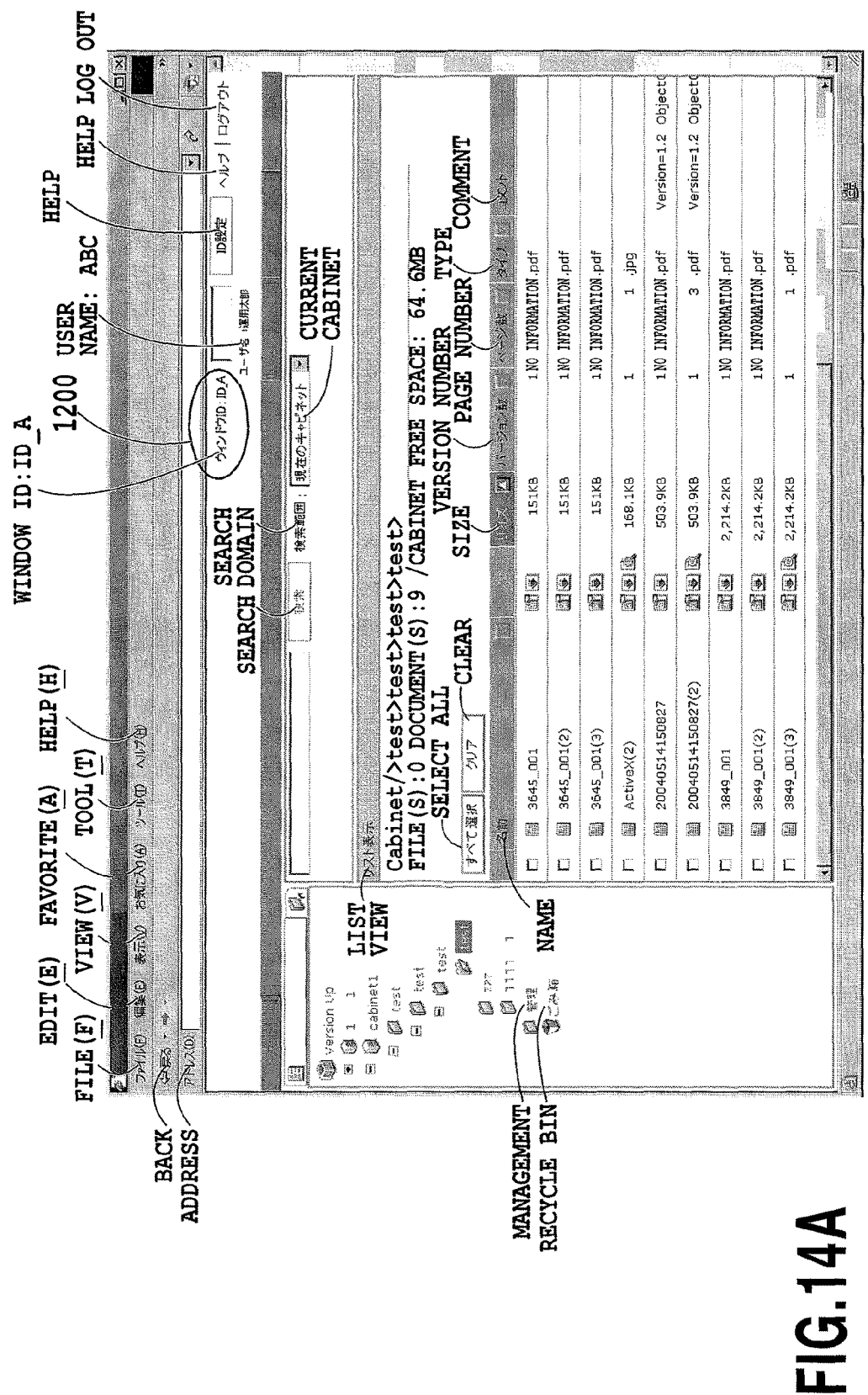
FIGS. 14A and 14B are diagrams for explaining a state of certain Web browsers after making an information share window IDs setting request in the first embodiment of the present invention.
Figure 14B:
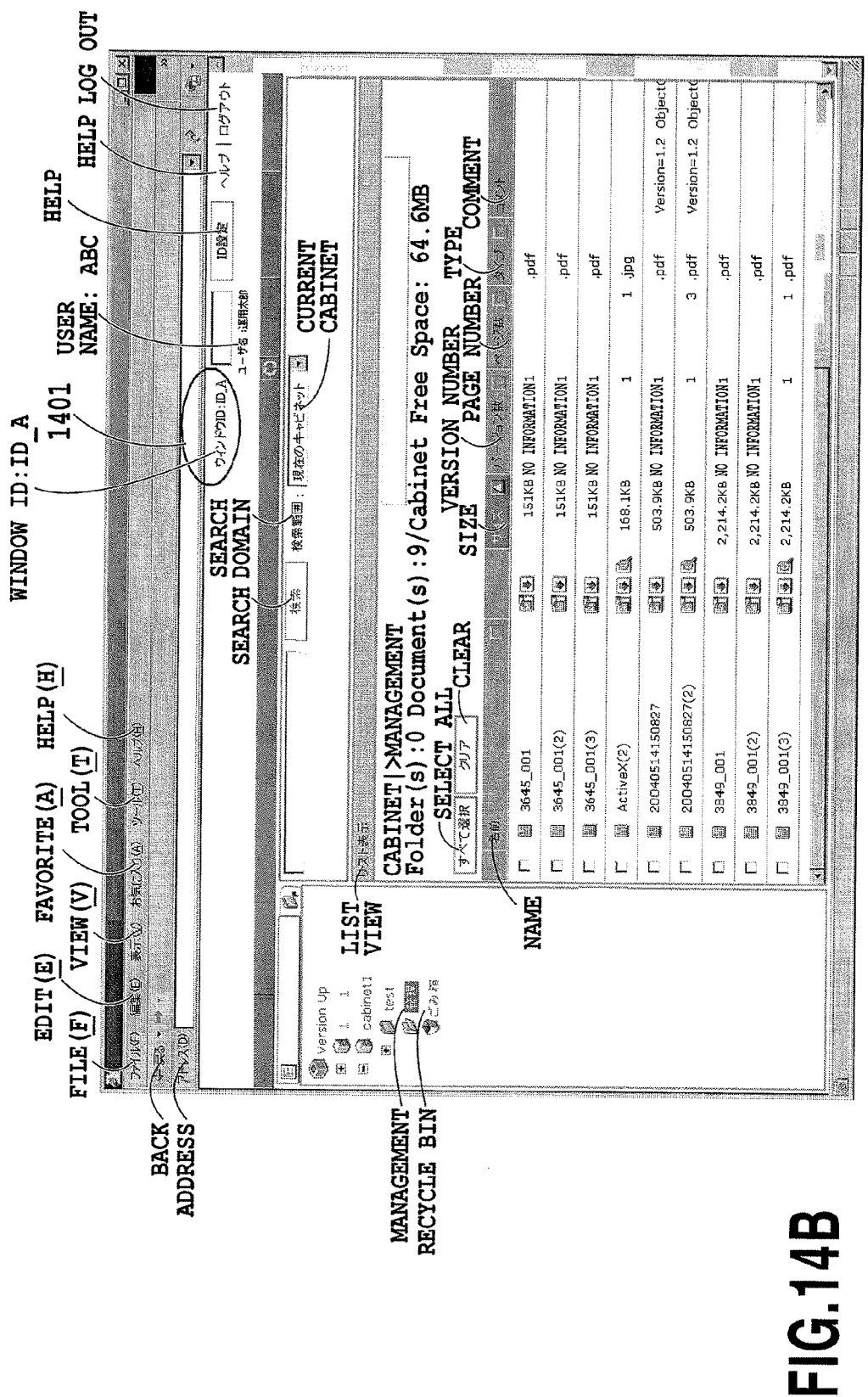

When the user presses down an information share window ID setting button 1301 on the Web browser 1003 in the state shown in FIG. 13B, the Web browser 1003 transmits the information share window ID setting request 1004. Then, as a replay to this request, the Web browser 1003 receives the information share window ID setting 1005. At this time, as shown by reference numeral 1401 in FIG. 14B, the information share window ID 1200 (ID_A) of the Web browser 1000 may be displayed on a window ID display area of the Web browser 1003. By this display, the user can know at a glance which windows share information with each other. Of course, an area showing the information share window ID of the share destination may be additionally provided.

Here, with reference to FIG. 15, detailed description will be given for registration processing for making a registration into the information share window ID management DB 713 of the document management server 700 upon receipt of the information share window ID setting request 1004.

Figure 15:
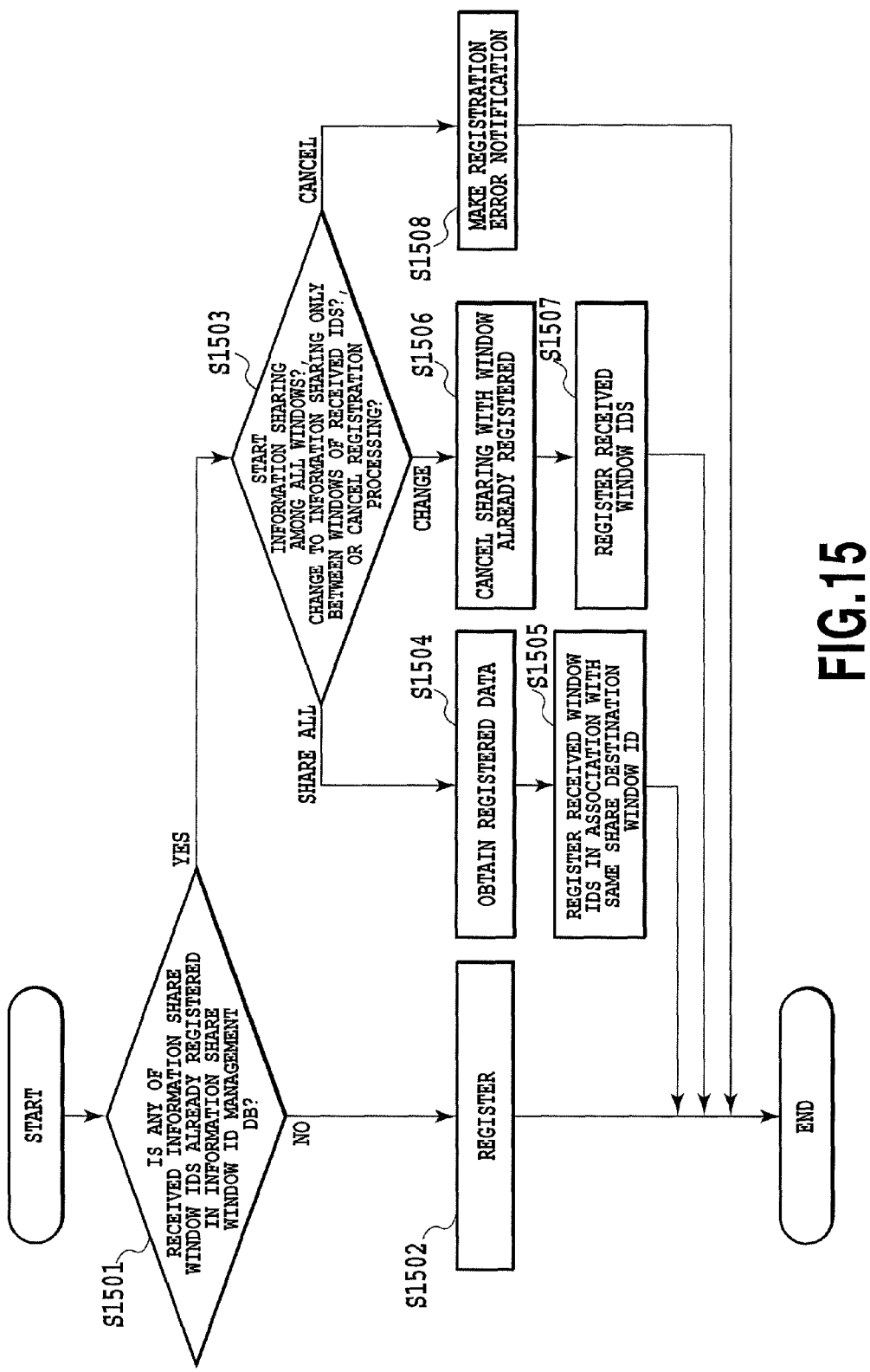
FIG. 15 is a processing flowchart of registration processing in which a document management server 700 makes a registration in the information share window ID management DB 713 upon receipt of an information share window ID setting request 1004 in the first embodiment of the present invention.

FIG. 15 is a processing flowchart of the registration processing.

Upon receipt of the information share window ID setting request 1004, the document management server 700 performs the following processing by means of the information share window ID managing section 712.

In the first place, the information share window ID managing section 712 checks the following point in S1501. Specifically, the information share window ID managing section 712 checks if any one of the received information share window IDs of the Web browser 1003 (browser B) and the Web browser 1000 (browser A) has already been registered in the information share window ID management DB 713.

If none of the IDs is registered, the processing moves to step S1502. Then, the ID of the Web browser 1000 (browser A) is registered as the share destination with respect to the ID of the Web browser 1003 (browser B).

On the other hand, if it is determined in S1501 that any of the IDs has already been registered in the information share window ID management DB 713 (there is a third window already sharing information with any one of the windows), the processing moves to step S1503. In S1503, the user is prompted to select one of choices of: starting the information sharing among all the windows including the third window; changing to the information sharing only between the windows having the received IDs; and canceling the registration processing. Then, the information share window ID managing section 712 determines which processing to perform. That is, the information share window ID managing section 712 notifies the user of the presence of the third window, and prompts the user to select one of choices of: making an information share among all the windows; changing the information sharing; and canceling the registration.

If it is determined in step S1503 that the user instructs to share information among all the windows, the information share window ID managing section 712 obtains the ID of the third window (for example, a browser C) from the information share window ID management DB 713 in the step S1504, and registers the window IDs of the browsers A and B in the step S1505 such that the browsers have the same share destination window ID. For example, when the ID of the browser C has been already registered as the share destination window ID with respect to the ID of the browser A, the information share window ID managing section 712 makes control such that the ID of the browser C is registered as the share destination window ID with respect to the ID of the browser B. In this way, the ID of the browser C is registered as the share destination window ID with respect to both the ID of the browser A and the ID of the browser B. Thus, the browsers A, B and C can share information.

On the other hand, if it is determined in step S1503 that the user instructs to change to the information sharing only between the windows having the received IDs, the processing moves to step S1506. Then, the sharing with the third window already sharing information is cancelled. For instance, if the ID of the browser C has already been registered as the share destination window ID with respect to the ID of the browser A, the registration information is deleted.

Thereafter, in step S1507, the information share window ID managing section 712 registers the received IDs so that the windows having the received window IDs can share information. Specifically, the ID of the browser A is registered as the share destination window ID with respect to the ID of the browser B such that the ID of the browser A is associated with the ID of the browser B.

In contrast, if it is determined in step S1503 that the user instructs to cancel the registration processing of the information share window, the information share window ID managing section 712 notifies the browser B of the cancellation of the registration in the step S1508, and then terminates the processing.

Incidentally, although this embodiment is configured to inquire of the user in step S1503 as described above, the processing is not limited to this. For instance, the information share window ID managing section 712 may always perform processing for allowing all the windows to share information.

As described above, the Web browser 1003 (browser B) and the Web browser 1000 (browser A) share (the browsers A and B are allowed to mutually use) the information share window ID through the processing in either of steps S1502 and S1507, and thus the preparation for enabling collaborative operations is completed. Instead, through the processing in step S1505, the browsers A, B and C share (all are allowed to mutually use) the information share window ID, and thus the preparation for enabling collaborative operations is completed.

Hereinafter, with reference to FIG. 16, the processing in the document management server 700 will be described by taking as an example a case where an item selected on the Web browser 1000 (browser A) is copied and pasted into a folder designated on the Web browser 1003 (browser B).

Figure 16:
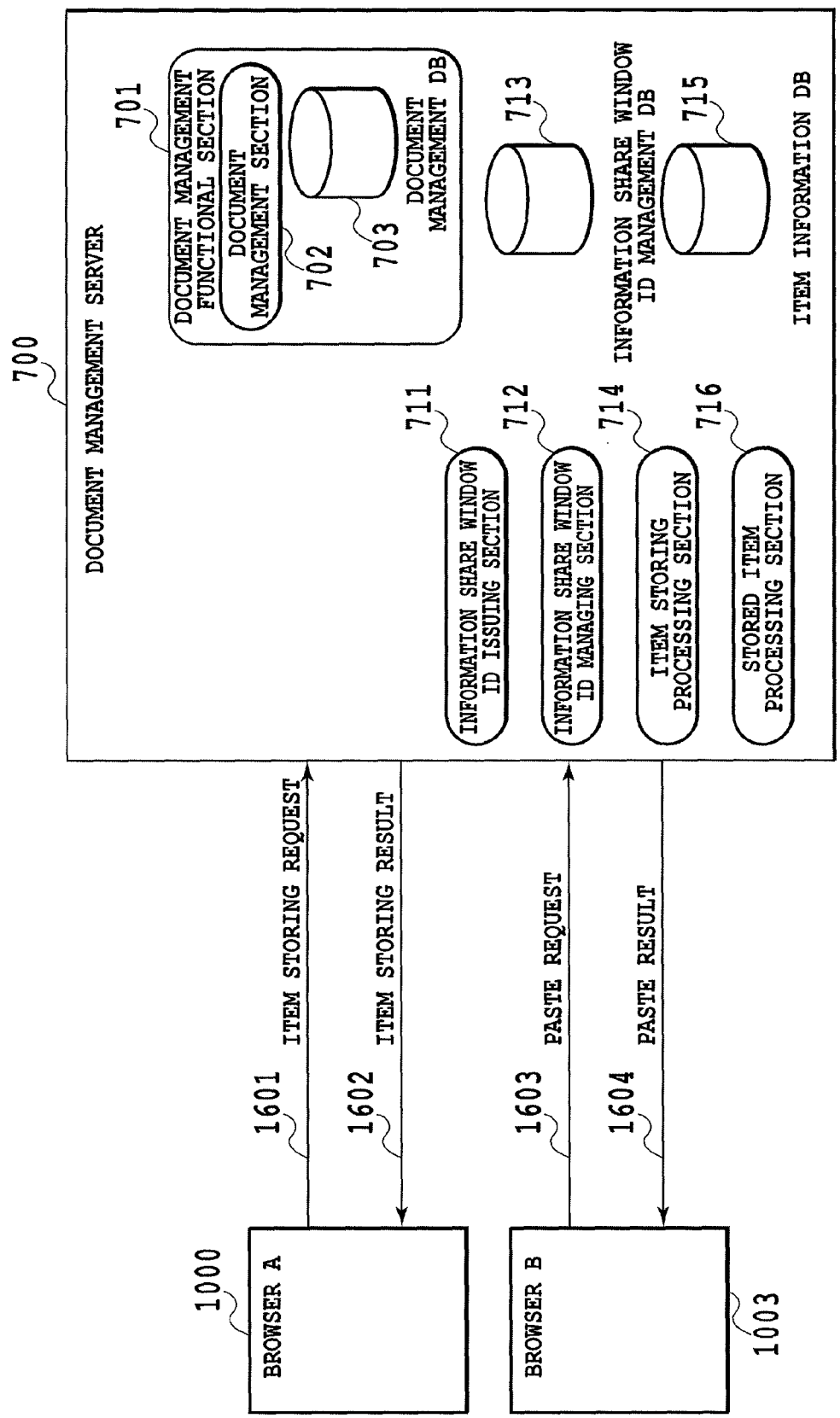
FIG. 16 is a conceptual diagram for explaining a mechanism for enabling collaborative operations between Web browsers 1000 and 1003 sharing the information share window ID in the first embodiment of the present invention.

FIG. 16 is a conceptual diagram for explaining a mechanism for enabling collaborative operations between the Web browsers 1000 and 1003 sharing the information share window ID.

First of all, when the user selects a certain item on the Web browser 1000 and issues an instruction for a copy operation, the Web browser 1000 transmits an item storing request 1601 to the document management server 700. This item storing request 1601 is equivalent to a request for copy processing in the copy & paste operation. This item storing request 1601 includes item information of an item designated on the Web browser that includes information specifying the selected item. The information of an item, itself, which is written in the source of a document displayed on the Web browser 1000, may be usable as the information specifying the item. The document management server 700 assigns the item ID to this information, or applies a pre-assigned item ID to this information. In an alternative manner, the document management server 700 may assign an item ID to an item in advance, then transmit the item ID to the Web browser 1000 including the item ID in a document to be displayed on the Web browser 1000, and thus cause the Web browser 1000 to use the item ID.

Upon receipt of the item storing request 1601, the item storing processing section 714 in the document management server 700 registers the item information (FIG. 8: see the item management table 800) of the selected item in the item information DB 715. Then, the item storing processing section 714 returns an item storing result 1602 as its reply to the Web browser 1000. In this way, the item information is registered in the document management server 700. Through the aforementioned processing for the information share window ID setting request, the windows are enabled to share information, and thus any one of the windows that share information therebetween can refer to the registered item information from the other window.

The following flow shows a case where an item designated on the Web browser 1000 and having the item information registered in the item information DB 715 is pasted through an operation on the Web browser 1003.

Firstly, the user selects a folder, to which the item is to be copied, on the Web browser 1003, and transmits a paste request 1603 to the document management server 700. This paste request 1603 includes information specifying a folder selected as a copy destination. As the information, the same kind of information as the information specifying the item in the item storing request 1601 can be used.

Upon receipt of the paste request 1603, the document management server 700 refers to the item information DB 715, and thereby obtains the item information of the item to be pasted, the item information stored in advance by the item storing request 1601.

After that, the document management server 700 pastes the item to be pasted in the copy destination folder designated by the paste request 1603.

After the paste processing, the document management server 700 transmits a paste result 1604 to the Web browser 1003. The paste result herein is a document representing the result of the paste processing.

Upon receipt of the paste result 1604, the Web browser 1003 displays the paste result, and thereby notifies the user of the paste result.

Next, the collaborative operations between the Web browsers 1000 and 1003 sharing the information share window ID will be further described in detail with reference to FIG. 17.

Figure 17:
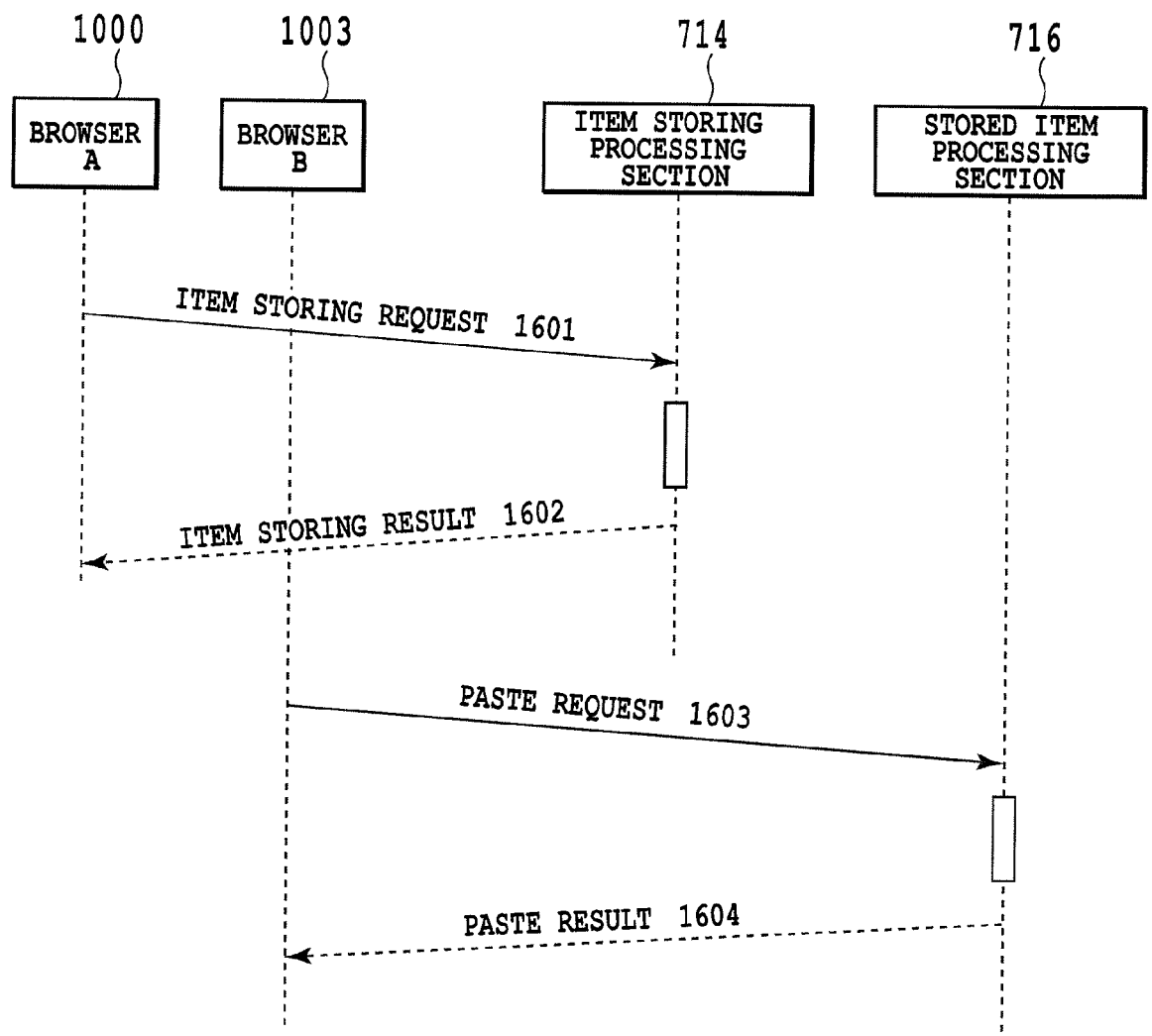
FIG. 17 is a sequence diagram for explaining the mechanism for enabling the collaborative operations between the Web browsers 1000 and 1003 sharing the information share window ID in the first embodiment of the present invention.

FIG. 17 is a sequence diagram for explaining the mechanism for enabling the collaborative operations between the Web browsers 1000 and 1003 sharing the information share window ID in FIG. 16.

While the Web browser 1000 (browser A) and the Web browser 1003 (browser B) share the information share window ID, the Web browser 1000 transmits the item storing request 1601. An event where a user presses down a certain button may be used as a trigger that causes the Web browser 1000 to transmit the item storing request 1601. Otherwise, by use of JavaScript or the like, the Web browser 1000 may be configured to obtain an event where the "Ctrl" key and the "C" key are pressed down as shortcut keys, and to transmit the item storing request 1601 to the document management server 700 at the timing when the event occurs.

Upon receipt of the item storing request 1601, the document management server 700 registers the item information in the item information DB 715 by means of the item storing processing section 714. The item information managed herein includes information such as the item ID 801, the item name 802, the operating user 803, the information share window ID 804, the simultaneous selection ID 805 and the lock flag 806 as shown in the aforementioned item information management table 800. At this time, if the user designates two or more items, two or more records which have the same information share window ID 804 and the same simultaneous selection ID 805 but different item IDs 801 and different item names 802 are registered in the item information DB 715. The document management server 700 returns the item storing result 1602 to the Web browser 1000 after the item storing processing section 714 registers the item information in the item information DB 715.

Then, after the user performs an operation on the Web browser 1003 to designate the copy destination folder, the Web browser 1003 transmits the paste request 1603 to the document management server 700. An event where a user presses down a certain button may be used as a trigger that causes the Web browser 1003 to transmit the paste request 1603. Otherwise, by use of JavaScript or the like, the Web browser 1003 may be configured to obtain an event where the "Ctrl" key and the "V" key are pressed down as shortcut keys, and to transmit the paste request 1603 to the document management server 700 at the timing when the event occurs.

Upon receipt of the paste request 1603, the document management server 700 obtains the share destination window ID from the information share window ID management DB 713 by means of the stored item processing section 716.

The stored item processing section 716 obtains the stored item information from the item information DB 715 based on the share destination window ID. Then, the document management server 700 performs paste processing in which an item corresponding to the obtained item information is pasted into the designated copy destination folder. When two or more item information are obtained, the paste processing is performed for the two or more items.

Next, with reference to FIG. 18, description will be given for the registration processing (especially, for lock processing) in which the document management server 700 makes a registration in the item information DB 715 upon receipt of the item storing request 1601.

Figure 18:
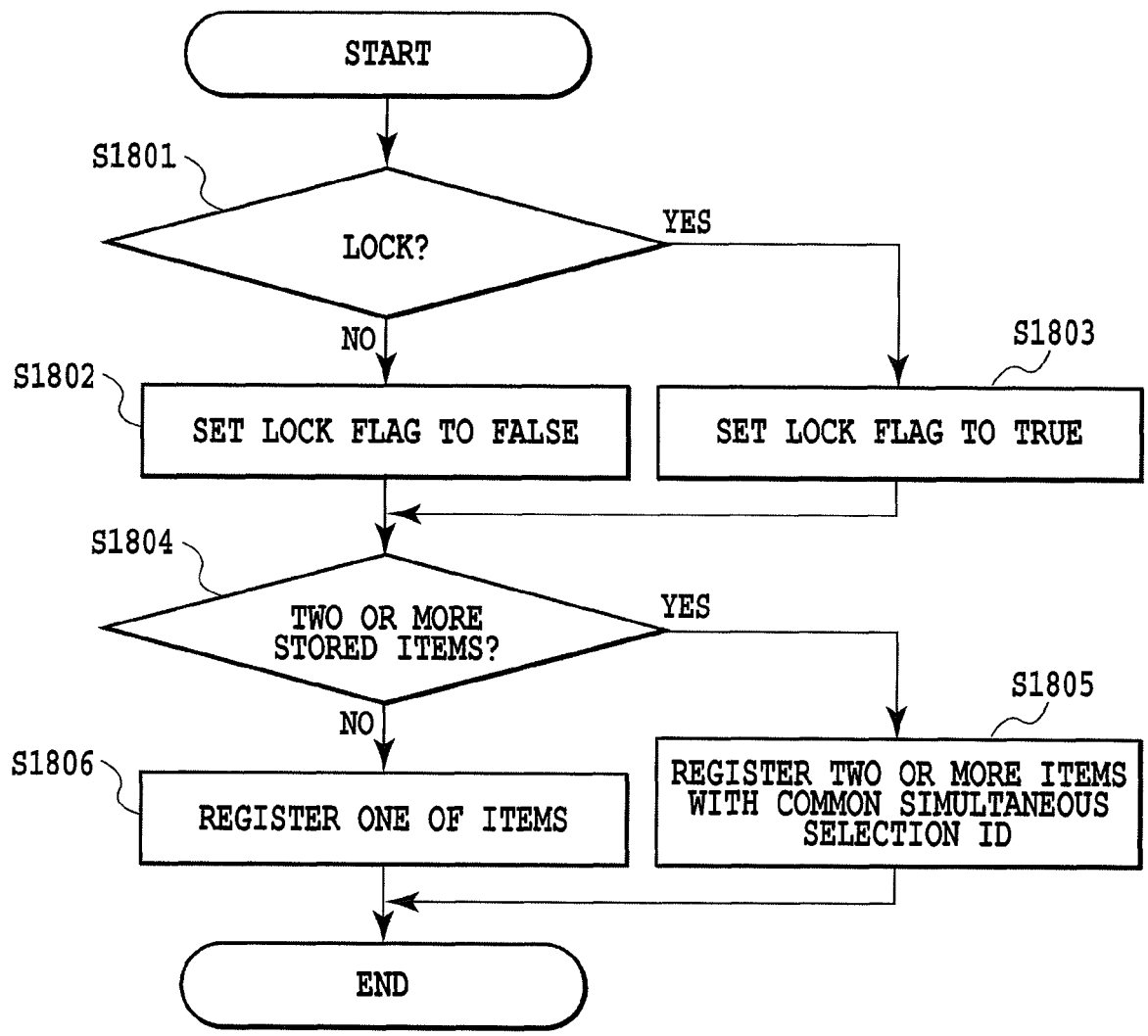
FIG. 18 is a processing flowchart of the registration processing in which the document management server 700 makes a registration in the item information DB 715 upon receipt of an item storing request 1601 in the first embodiment of the present invention.

FIG. 18 is a processing flowchart of the registration processing.

Once the document management server 700 receives the item storing request 1601, the stored item processing section 716 in the document management server 700 performs the following processing.

To begin with, the stored item processing section 716 determines whether to lock the item, according to lock information in the item storing request 1601 (S1801). Based on the determination result, the stored item processing section 716 sets a lock flag to True or False. The lock flag is set to True (S1803) in order to lock the item, and the lock flag is set to False (S1802) in order not to lock the item. The lock flag is a flag for prohibiting other users from changing the item.

Then, the stored item processing section 716 registers the item information in the item information DB 715. The item information includes information such as the item ID 801, the item name 802, the operating user 803, the information share window ID 804, the simultaneous selection ID 805 and the lock flag 806 as shown in the item information management table 800. At this time, if the user designates two or more items, two or more records are registered in the item information DB 715 to have the same operating user 803, the same information share window ID 804 and the same simultaneous selection ID 805 but different item IDs 801 and different item names 802 (S1805). On the other hand, if the user designates only one item (if No in S1804), the record for the designated item is registered in the item information DB 715 (S1806).

Herein, detailed descriptions will be provided for the paste processing performed by the document management server 700 upon receipt of the paste request 1603.

Figure 19:
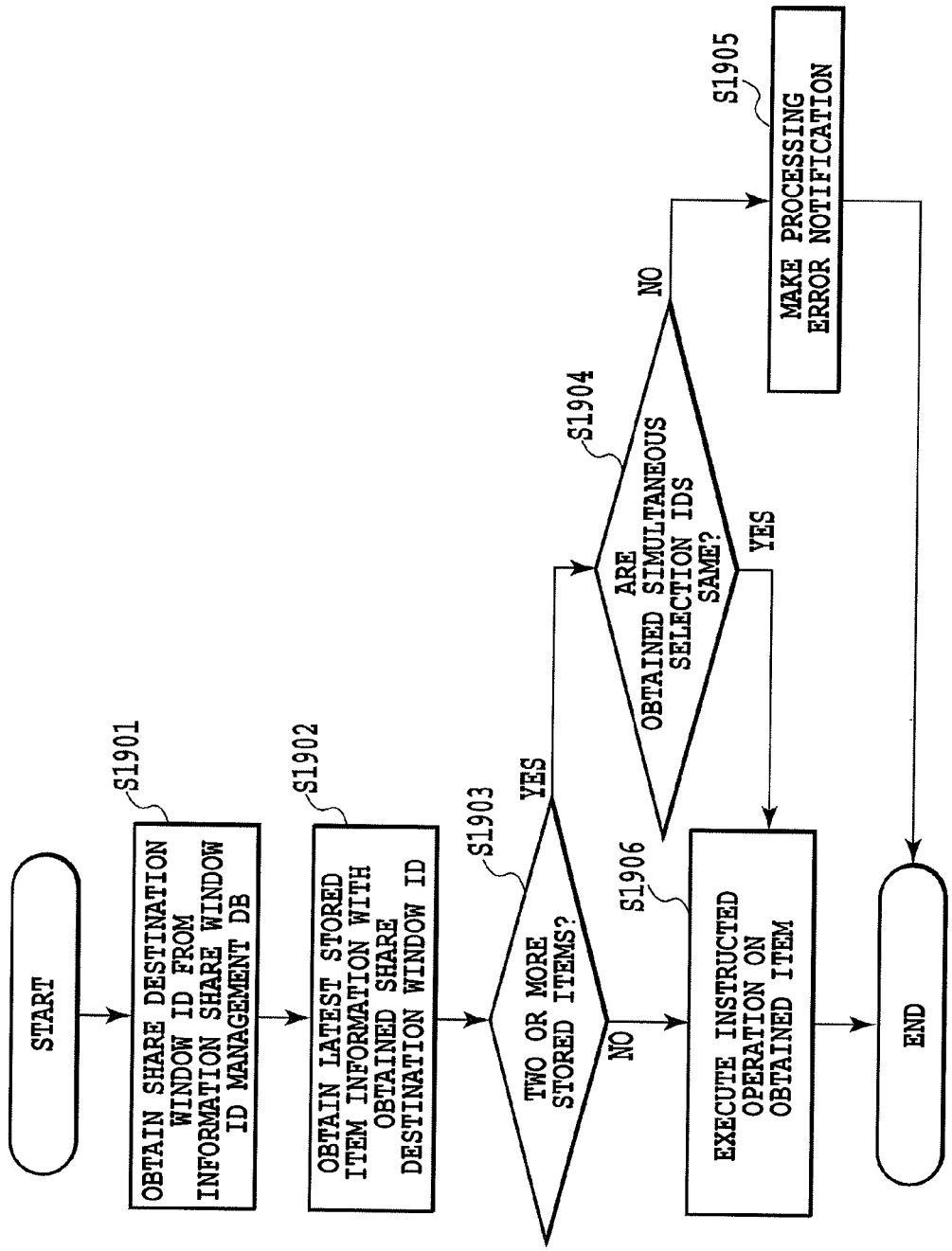
FIG. 19 is a processing flowchart of paste processing performed by the document management server 700 upon receipt of a paste request 1603 in the first embodiment of the present invention.

FIG. 19 is a processing flowchart of the paste processing.

Upon receipt of the paste request 1603, the document management server 700 performs the following processing by means of the stored item processing section 716.

Firstly, the stored item processing section 716 accesses the information share window ID management DB 713, and obtains the share destination window ID of the Web browser 1003 (S1901). The share destination window ID obtained herein is the information share window ID of the Web browser 1000.

Then, the stored item processing section 716 accesses the item information DB 715, and obtains stored item information corresponding to the information share window ID of the Web browser 1000 obtained as a share destination window ID and its operating user (S1902).

Subsequently, the stored item processing section 716 determines, based on the obtained item information, if there are two or more items to be copied (S1903).

If there are two or more items to be copied, the stored item processing section 716 further determines whether or not the simultaneous selection IDs of these items are the same (S1904). If not the same, the stored item processing section 716 makes a notification of a processing error (S1905).

In contrast, if the simultaneous selection IDs of these items are the same, or if there is only one item to be copied, the stored item processing section 716 performs the paste processing of pasting one or more items to be copied, into the designated copy destination folder. As for the paste processing herein, the stored item processing section 716 instructs the document management functional section 701 to perform the copy & paste processing on one or more actual files, and thus the document management functional section 701 actually performs the copy & paste processing.

Meanwhile, one of the following conceivable methods can be used as the method of obtaining item information stored in memory.

[Obtaining Method 1]

All item information having the information share window ID, obtained as the share destination window ID, of the Web browser 1000 are obtained from among the item information stored in the item information DB 715.

[Obtaining Method 2]

A sequential number is assigned to each simultaneous selection ID when the simultaneous selection ID is issued. Then, item information having the latest simultaneous selection ID is obtained from among the item information obtained by the obtaining method 1.

[Obtaining Method 3]

Item information having a simultaneous selection ID designated by a user is obtained from among the item information obtained by the obtaining method 1. A user can designate the simultaneous selection ID in the following way. Specifically, when returning the item storing result 1602 from the document management server 700 to the Web browser 1000, simultaneous selection ID is assigned, and then the document management server 700 concurrently transmits the simultaneous selection ID and the item storing result 1602. The Web browser 1000 displays the item storing result and the simultaneous selection ID upon receipt of the item storing result 1602, and thus notifies the user of them. Thereafter, when the user desires to perform the paste processing, the user designates the simultaneous selection ID by inputting the simultaneous selection ID onto the Web browser 1003. When the Web browser 1003 transmits the paste request 1603, the simultaneous selection ID inputted by the user is also transmitted together with the paste request 1603.

When a plurality of items are obtained with the obtaining method 2 or the obtaining method 3, and if each of the item information has the same simultaneous selection ID, the paste processing is performed to paste all the obtained items into the copy destination folder (foregoing S1906). In contrast, if several items are obtained and at least one simultaneous selection ID of the item information is different from the others, the stored item processing section 716 determines that a processing error occurs, and thus makes an error notification (foregoing S1905).

Next, one of the following conceivable methods can be used as the method of deleting item information stored in item information DB 715.

[Deleting Method 1]

At a time of log-out of an operating user having been accessing the item information DB 715, all item information related to the operating user are deleted. Incidentally, the operating user is specified by the user ID which is designated when the operating user logs in.

[Deleting Method 2]

A sequential number is assigned to each simultaneous selection ID when the simultaneous selection ID is issued. Then, the user transmits an item stored information deleting request from the Web browser to the document management server 700. Upon receipt of the item stored information deleting request, the document management server 700 causes the stored item processing section 716 to perform item stored information deleting processing. The stored item processing section 716 accesses the item information DB 715 and deletes the item information having the latest simultaneous selection ID from among the item information related to the same operating user.

[Deleting Method 3]

The user transmits an item stored information list request from the Web browser to the document management server 700. The document management server 700 accesses the item information DB 715, obtains all item information related to the operating user having transmitted the item stored information list request, and then returning the obtained item information to the Web browser used by the operating user. The Web browser displays the received item information, and thus notifies the user of them. The user selects any of the displayed item information, and transmits an arbitrarily-selected-item stored information deleting request to the document management server 700. Upon receipt of the arbitrarily-selected-item stored information deleting request, the document management server 700 causes the stored item processing section 716 to perform the item stored information deleting processing regarding the selected item information. The stored item processing section 716 accesses the item information DB 715, and deletes the item information specified by the arbitrarily-selected-item stored information deleting request.

Although the collaborative operations have been described with respect to the copy & paste operation in the aforementioned examples, the collaborative operations are not limited to the above application, and two or more Web browser windows are also enabled to operate collaboratively with each other in a cut & paste operation. Incidentally, generally speaking, a copy operation and a cut operation are firstly performed as a first operation, and then a paste operation is performed as a second operation following the first operation.

As described above, according to the present invention, when the copy & paste operation (replication) or the cut & paste operation (move) is performed in a document management system in which operations are performed on Web browsers, the document management system enables two or more Web browsers to operate collaboratively with each other.

In the embodiment, the collaboration between the multiple Web browsers has been described, but the operation of storing the item information and then performing certain processing on the stored item information may be performed on a single Web browser, as a matter of course. When the operation is performed on the single Web browser, the user does not have to transmit the information share window ID setting request 1004 from the Web browser 1003.

Second Embodiment

In the document management system of the foregoing first embodiment, the Web browser 1000 transmits a lock flag when transmitting the item storing request 1601 with designating an item to be operated for replication or movement. The lock flag herein is information indicating an instruction to "lock" the item. In this way, as described above, the stored item can be locked so as to be protected from operations by other users.

In this embodiment, the document management server 700 performs the same processing as that described based on FIG. 11 in the first embodiment after a user launches Web browsers 1000 and 1003 to log in to a document management system, and until the issuing of the information share window ID is completed. Moreover, upon receipt of the information share window ID setting request 1004 after the Web browser 1003 transmits the information share window ID setting request 1004, the document management server 700 also performs the same processing as that described based on FIG. 11 in the first embodiment. Additionally, upon receipt of the item storing request 1601, the document management server 700 performs the same processing as that described based on FIG. 18.

Figure 20:
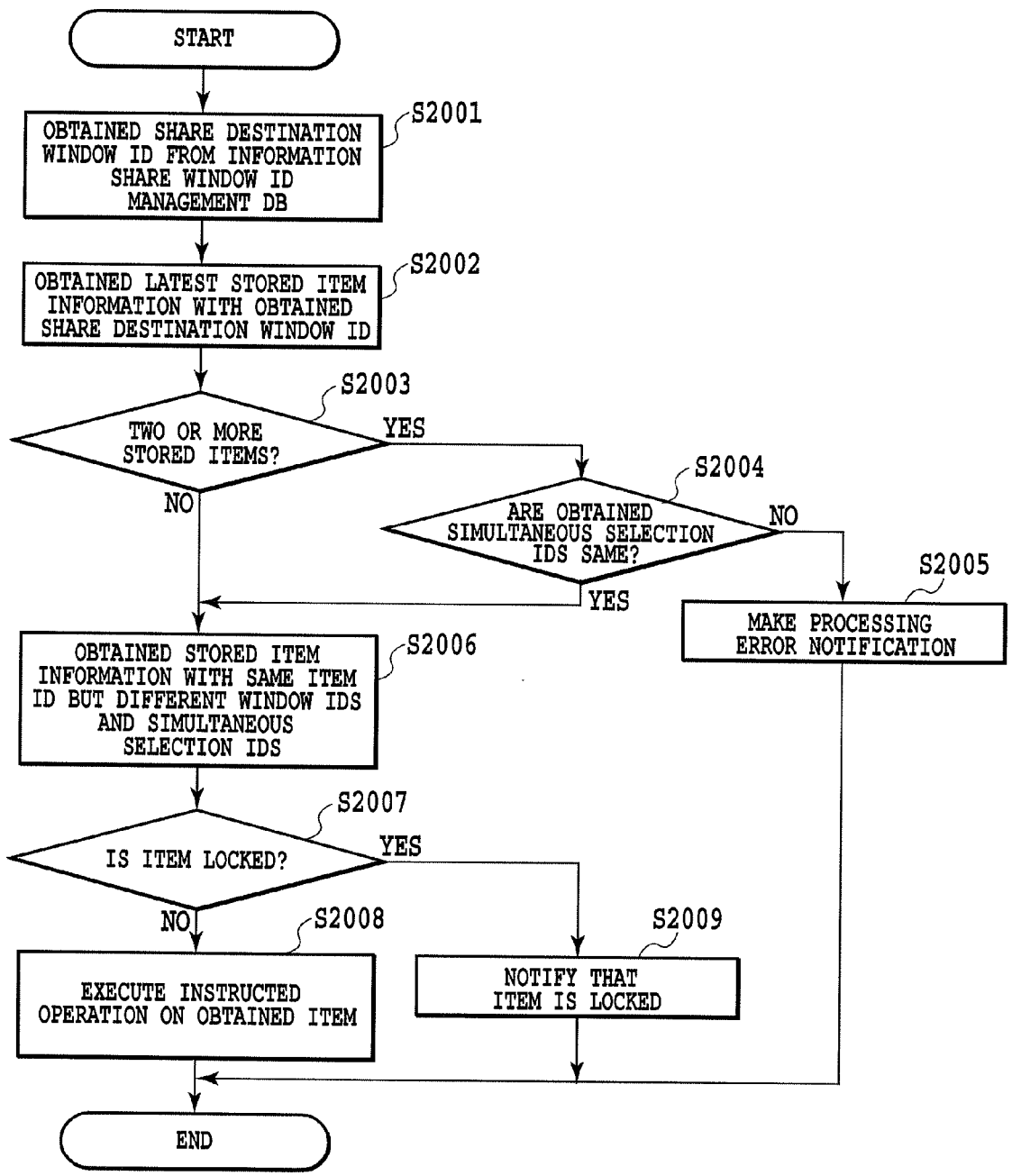
FIG. 20 is a processing flowchart of paste processing with locking an item executed by a document management server 700 upon receipt of a paste request 1603 in a second embodiment of the present invention.

FIG. 20 is a flowchart of paste processing with locking an item executed by the document management server 700 upon receipt of a paste request 1603 according to this embodiment.

The stored item processing section 716 accesses the information share window ID management DB 713, and obtains the share destination window ID of the Web browser 1003 (S2001). The share destination window ID obtained here is the information share window ID of the Web browser 1000.

Then, the stored item processing section 716 accesses the item information DB 715, and then obtains a latest item information from among the stored item information corresponding to the information share window ID of the Web browser 1000 that is obtained as the share destination window ID, and the operating user (S2002).

When two or more items are included in the item information obtained here (if Yes in step S2003), and when at least one simultaneous selection ID of item information is different from the others (if No in step S2004), the document management server 700 determines that a processing error occurs, and makes a notification of a processing error (S2005).

Otherwise, the document management server 700 obtains item information (A) having the same item ID as the obtained item information, but a different window ID and a different simultaneous selection ID from those of the obtained item information (S2006). Then, the document management server 700 checks if the item is locked by another user or the like, by referring to the lock flag in the obtained item information (A) (S2007). If the item is not locked (No in step S2007), the document management server 700 executes paste processing to paste the obtained item into a designated copy destination folder (S2008). At this time, if two or more items are obtained, the paste processing is performed to paste all the obtained items into the copy destination folder.

On the other hand, if the item is locked (if Yes in S2007), the document management server 700 notifies, via the paste result 1604, the user that the item is locked (S2009).

Here, one of the following conceivable methods can be used as a method of canceling an instruction to lock item information stored in item information DB 715.

[Unlocking Method 1]

When the simultaneous selection ID is issued, a sequential number is assigned and added to the simultaneous selection ID. Then, the user transmits an unlock request from the Web browser to the document management server 700. Upon receipt of the unlock request, the document management server 700 causes the stored item processing section 716 to execute unlock processing. Specifically, the stored item processing section 716 accesses the item information DB 715, and then changes the lock flag, from "lock" to "unlock," of the item information corresponding to the operating user who has transmitted the unlock request and having the latest simultaneous selection ID from among the item information specified to be "locked."

[Unlocking Method 2]

The user transmits a lock item stored information list request from the Web browser to the document management server 700. The document management server 700 accesses the item information DB 715, obtains all the item information specified to be "locked" and corresponding to the operating user who has transmitted the lock item stored information list request, and then returns the obtained item information to the web browser of the user. This Web browser displays the received item information, and thereby notifies the user. The user selects any item information from among the displayed item information, and transmits an arbitrarily-selected-item unlock request. Upon receipt of the arbitrarily-selected-item unlock request, the document management server 700 causes the stored item processing section 716 to execute the unlock processing for the item information. The item storing processing section 714 accesses the item information DB 715, and changes the lock flag, from "lock" to "unlock," of the item information designated by the arbitrarily-selected-item unlock request.

Incidentally, when the Web browser 1000 transmits the item storing request 1601, the information indicating the instruction to "lock" the item may be transmitted as a default, or whether to "lock/unlock" can be selected through a user's operation.

As described above, a stored item is locked in order to prevent another user from performing an operation of changing the stored item. Locking a stored item to be operated for a certain purpose prevents a loss of the item which might occur as a result of an operation by another user.

Moreover, even when a stored item is locked in order to prevent another user from operating the item, the item can be traced by the system and can be operated for copying or the like. This is because the stored item to be operated for a certain purpose is also managed by the ID.

Heretofore, the embodiments of the present invention have been explained.

Note that the object of the present invention is achieved using program codes for implementing the procedures in the flowcharts in the foregoing embodiments or a storage medium storing these program codes. In this case, a computer (instead, a CPU or an MPU) of a system or an apparatus reads out the program codes from the storage medium, and executes the program codes.

Here, the program codes per se read from the storage medium cause the computer to implement the functions of the foregoing embodiments. Thus, either of these program codes or a computer-readable storage medium that stores/records these program codes constitutes one aspect of the present invention.

Examples of a medium usable as the storage medium for providing the program codes include a floppy disk, a hard disk, an optical disk, a magneto-optical disk, a CD-ROM, a CD-R, a magnetic tape, a non-volatile memory card, a ROM and the like.

As described above, the functions of the foregoing embodiments are implemented by a computer executing a read-out program. The execution of the program also includes executing, by an OS operating on the computer, a part or whole of actual processing in accordance with commands of the program.

Instead, the functions of the foregoing embodiments can be implemented by an enhanced board inserted in a computer or an enhanced unit connected to a computer. In this case, the program read from the storage medium is written to a memory provided to the enhanced board inserted in the computer or the enhanced unit connected to the computer. Thereafter, in accordance with the commands of the program, a CPU or the like equipped in the enhanced board or the enhanced unit executes a part or whole of the actual processing. Thus, the functions of the foregoing embodiments are implemented through the processing executed by the enhanced board or the enhanced unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-244100, filed Sep. 20, 2007, which is hereby incorporated by reference herein in its entirety.

What is claimed is:

1. A server system, comprising:
a communication unit configured to communicate with a first web browser which is launched on a first client and which identification information is input into, and a second web browser which is launched on a second client and which identification information is input into;
a determination unit configured to determine whether the same identification information as the one input into the first web browser is input by a user into the second web browser;
a storage unit configured to store data which can be displayed by the first and second web browsers;
a setting unit configured to set, in response to a copy instruction for copying data being displayed by the first web browser given via the first web browser, a pasting object candidate to the data already stored in the storage unit; and
a pasting unit configured to paste, in response to a pasting instruction for pasting the pasting object candidate given via the second web browser, the pasting object candidate set by the setting unit into a destination specified via the second web browser, the destination being located outside the second client which launches the second web browser, wherein a result of the pasting is displayed by the second web browser,
wherein, in response to the determination unit determining that the same identification information as the one input into the first web browser is input into the second web browser, the pasting instruction via the second web browser, for pasting the pasting object candidate into the destination being displayed by the second web browser is permitted for the pasting object candidate which has been set on the server system by the setting unit.

2. The server system according to claim 1, wherein in a case where the determination unit determines that the same identification information as the one input into the first web browser is not input into the second web browser, the pasting object candidate is not permitted to be pasted into the destination selected by the user in the second web browser.

3. The server system according to claim 1, wherein the input of the same identification information as the one input into the first web browser by a user via the second web browser is an input of the same identification information into a field displayed in the second web browser.

4. The server system according to claim 1, further comprising:
a managing unit configured to manage the stored data; and
a control unit configured to control displaying of the managed data in the first web browser and the second web browser,
wherein the control unit controls displaying in the second web browser the result of the pasting of the stored data.

5. The server system according to claim 1, wherein the first client and the second client are the same.

6. The server system according to claim 1, wherein the first client and the second client are different.

7. A server system comprising:
a communicating unit configured to allow communication with a first web browser which is launched on a first client and which first identification information is input into, and a second web browser which is launched on a second client and which second identification information is input into, and a third web browser which is launched on a third client and which the same identification information as the first identification information is input into;
a storage unit configured to store data which can be displayed by the first, second and third web browsers;
a setting unit configured to set, in response to a copy instruction for copying data being displayed by the first web browser given via the first web browser, a first pasting object candidate associated with the first identification information to the data already stored in the storage unit, and to set, in response to a copy instruction for copying data being displayed by the second web browser given via the second web browser, a second pasting object candidate associated with the second identification information to the data already stored in the storage unit;

a pasting unit configured to paste, in response to a pasting instruction for pasting a pasting object candidate given via the third web browser, the pasting object candidate into a destination specified via the third web browser, the destination being located outside the third client which launches the third web browser, wherein a result of the pasting is displayed by the third web browser; and a controlling unit configured to control the pasting unit so that:

the pasting instruction via the third web browser for pasting the first pasting object candidate associated with the first identification information into the destination being displayed by the third web browser is possible for the first pasting object candidate which has been set on the server system by the setting unit, and the pasting instruction via the third web browser for pasting the second pasting object candidate associated with the second identification information into the destination specified via the third web browser is not possible for the second pasting object candidate which has been set on the server system by the setting unit.

8. The server system according to claim 7, further comprising:

a determination unit configured to determine whether the identification information which has been input into the third web browser is the same identification information as the first identification information, wherein the control unit controls the pasting unit in a case where the determination unit determines that the identification information which has been input into the third web browser is the same identification information as the first identification information.

9. The server system according to claim 7, wherein, the storage unit stores a plurality of pieces of data, the setting unit sets a plurality of pasting object candidates to the plurality of pieces of data stored in the storage unit respectively, and the pasting unit pastes, in response to the pasting instruction given via the third web browser to paste a pasting object candidate selected from among the plurality of pasting object candidates via the third web browser, the selected pasting object candidate to a destination displayed by the third web browser, wherein a plurality of pasting object candidates set by the setting unit except for the selected one are not pasted in response to the pasting instruction given via the third web browser.

10. The server system according to claim 7, further comprising:

a cancelling unit configured to, in response to instructions given via the first, second, or third web browser to cancel a pasting object candidate, remove from the pasting object candidates the data which the pasting object candidate has been set to, wherein, before cancelling a pasting object candidate, the cancelling unit displays, by the web browser via which the instruction to cancel a pasting object candidate are given, a pasting object candidate to be cancelled.

11. The server system according to claim 7, further comprising:

a cancelling unit configured to allow the data to which the first pasting object candidate associated with the first identification information has been set to be removed from the pasting object candidates in response to an instruction to cancel the first pasting object candidate given via the first web browser, and to allow the data to which the second pasting object candidate associated with the second identification information has been set to remain unchanged.

12. The server system according to claim 11, wherein before cancelling the first pasting object candidate, the cancelling unit allows the data to which the first pasting object candidate has been set to be displayed by the first web browser through which the instruction to cancel the first pasting object candidate is given.

13. The server system according to claim 12, wherein before cancelling the first pasting object candidate, the cancelling unit prevents the data to which the first pasting object candidate has been set from being displayed by the third web browser where the first identification information which has been input into the first web browser is input.

14. The server system according to claim 7, further comprising:

a cancelling unit configured to allow the data to which the first pasting object candidate associated with the first identification information has been set to be removed from the pasting object candidates in response to an instruction to cancel the first pasting object candidate given via the third web browser, and to allow the data to which the second pasting object candidate associated with the second identification information has been set to remain unchanged.

15. The server system according to claim 14, wherein before cancelling the first pasting object candidate, the cancelling unit allows the data to which the first pasting object candidate has been set to be displayed by the third web browser through which the instruction to cancel the first pasting object candidate is given.

16. The server system according to claim 15, wherein before cancelling the first pasting object candidate, the cancelling unit prevents the data to which the first pasting object candidate has been set from being displayed by the first web browser where the first identification information which has been input into the third web browser has been input.

17. The server system according to claim 7, wherein the setting unit allows information for identifying the data stored in the storage unit to be registered in a list of pasting object candidates, thereby setting the pasting object candidate to the data stored in the storage unit.

18. The server system according to claim 17, wherein the pasting unit pastes the pasting object candidate by the data identified using the information registered in the list of pasting object candidates.

19. The server system according to claim 7, wherein:

in a case where an instruction to copy the data displayed by the first web browser is given via the first web browser, the setting unit sets the first pasting object candidate associated with the first identification information to the data stored in the storage unit by registering information for identifying the data stored in the storage unit into a list of pasting object candidates with the first identification information associated therewith; and in a case where an instruction to copy the data displayed by the second web browser is given via the second web browser, the setting unit sets the second pasting object candidate associated with the second identification information to the data stored in the storage unit by registering information for identifying the data stored in the storage unit into a list of pasting object candidates with the second identification information associated therewith.

20. The server system according to claim 19, wherein the pasting unit pastes the pasting object candidate by the data identified using the information registered in the list of pasting object candidates.

21. The server system according to claim 7, wherein the setting unit allows the data stored in the storage unit to be copied in a data area of pasting object candidates, thereby setting the data stored in the storage unit to the pasting object candidate.

22. The server system according to claim 21, wherein the pasting unit pastes the pasting object candidate by the data copied in the data area of pasting object candidates.

23. The server system according to claim 7, wherein:
in a case where an instruction to copy the data displayed by the first web browser is given via the first web browser, the setting unit sets the first pasting object candidate associated with the first identification information to the data stored in the storage unit by copying the data stored in the storage unit into a data area of pasting object candidates with the first identification information associated therewith; and
in a case where an instruction to copy the data displayed by the second web browser is given via the second web browser, the setting unit sets the second pasting object candidate associated with the second identification information to the data stored in the storage unit by copying the data stored in the storage unit into the data area of pasting object candidates with the second identification information associated therewith.

24. The server system according to claim 23, wherein the pasting unit pastes the pasting object candidate by the data copied in the data area of pasting object candidates.

25. The server system according to claim 7, wherein the data is a plurality of pieces of the data which can be distinguished from one another.

26. The server system according to claim 7,
wherein the server system provides a software application service to a client through the Internet, and the client launches a web browser to use the software application service,
wherein the storage unit, the setting unit, the pasting unit, and the controlling unit are operated in the service.

27. A server system, comprising:
a communicating unit configured to communicate with a first web browser which first identification information is input into, a second web browser which the first identification information is input into, and a third web browser which second identification information is input into;
a storage unit configured to store data which is able to be displayed by the first web browser which the first identification has been input into; and
a setting unit configured to set, in response to a copy instruction for copying the data already stored in the storage unit which is being displayed by the first web browser, a pasting object candidate to the data already stored in the storage unit, the copy instruction being given via the first web browser into which the first identification information has been input,
wherein, in response to a pasting instruction for pasting the pasting object candidate into a destination under a condition where the pasting object candidate is being set to the data already stored in the storage unit, the pasting object candidate is able to be pasted into the destination, the pasting instruction being given via the second web browser into which the first identification information has been input, and the destination being located outside the second web browser,
wherein, under the condition where the pasting object candidate is kept set to the data already stored in the storage unit, the data already stored in the storage unit is able to be displayed by the third web browser which the second identification information has been input into, but the pasting object candidate is unable to be pasted using the third web browser which the second identification information has been input into.

28. The server system according to claim 27, wherein the data already stored in the storage unit is data which has been already stored in the storage unit before the copy instruction is given.

29. The server system according to claim 27,
wherein the server system provides a software application service through the Internet, and the software application service is used via the first web browser and the second web browser,
wherein the storage unit and the setting unit are operated in the software application service.

30. The server system according to claim 29,
wherein first identification information and second identification information are input into the first web browser and the second web browser respectively to use the software application service,
wherein the server system further comprises a determination unit configured to determine whether the same identification information as the one input into the first web browser is input into the second web browser, and
wherein, in a case where the determination unit determines that the same identification information as the one input into the first web browser is input to the second web browser, the pasting instruction given via the second web browser is permitted.

31. The server system according to claim 27, wherein the destination is a storage area whose data is displayed by the second web browser.

32. The server system according to 27, wherein the destination is specified via the second web browser.

33. The server system according to claim 27, wherein the destination is located inside the server system.

34. The server system according to claim 27, wherein the paste of the pasting object candidate is performed by storing the pasting object candidate into the destination.

35. The server system according to claim 34, wherein the destination is a storage area whose data is displayed by the second web browser.

36. The server system according to claim 27, wherein a result of the paste is displayed by the second web browser.

37. The server system according to claim 27, further comprising a processing unit configured to perform a process such that the pasting object candidate is pasted, in response to the pasting instruction given via the second web browser, into the destination.

38. The server system according to claim 37, wherein the processing unit directly pastes the pasting object candidate to the destination.

39. The server system according to claim 37, wherein the processing unit indirectly pastes the pasting object candidate to the destination using the second web browser.

40. The server system according to claim 27, wherein the first web browser and the second web browser are the same.

41. The server system according to claim 27, wherein the first web browser and the second web browser are different.

42. A server system communicating with a web browser, comprising:

a storage unit configured to store data which is able to be displayed by a web browser in which first identification information is input into; and a setting unit configured to set, according to a copy instruction for copying the data already stored in the storage unit which is being displayed by the web browser in which the first identification information has been input into, a pasting object candidate to the data already stored in the storage unit, the copy instruction being given via the web browser in which the first identification information has been input into, wherein, according to a pasting instruction for pasting the pasting object candidate into a destination under a condition where the pasting object candidate is being set to the data already stored in the storage unit, the pasting object candidate is able to be pasted into the destination, the pasting instruction being given via the web browser in which the first identification information has been input into, and wherein, under the condition where the pasting object candidate is kept set to the data already stored in the storage unit, the data already stored in the storage unit is able to be displayed by a web browser in which second identification information different from the first identification information has been input into, but the pasting object candidate is unable to be pasted using the web browser in which the second identification information has been input into.

\* \* \* \* \*